United States Patent
Jackson

(10) Patent No.: US 12,417,852 B1
(45) Date of Patent: Sep. 16, 2025

(54) ION TRANSPORT

(71) Applicant: Beam Alpha, Inc., West Chicago, IL (US)

(72) Inventor: Gerald Peter Jackson, Lisle, IL (US)

(73) Assignee: Beam Alpha, Inc., West Chicago, IL (US)

( * ) Notice: Subject to any disclaimer, the term of this patent is extended or adjusted under 35 U.S.C. 154(b) by 747 days.

(21) Appl. No.: 17/148,489

(22) Filed: Jan. 13, 2021

Related U.S. Application Data

(60) Provisional application No. 62/995,168, filed on Jan. 14, 2020.

(51) Int. Cl.
| | |
|---|---|
| *G21B 1/13* | (2006.01) |
| *G21B 3/00* | (2006.01) |
| *G21B 1/11* | (2006.01) |
| *G21G 1/10* | (2006.01) |

(52) U.S. Cl.
CPC ............... *G21B 3/006* (2013.01); *G21B 1/13* (2013.01); *G21B 1/115* (2013.01); *G21G 1/10* (2013.01)

(58) Field of Classification Search
CPC .................................. G21B 1/13; G21B 1/115
See application file for complete search history.

(56) References Cited

U.S. PATENT DOCUMENTS

| | | | |
|---|---|---|---|
| 2,905,610 A | 9/1959 | Wigner | |
| 3,120,475 A | 2/1964 | Bennett | |
| 3,258,402 A * | 6/1966 | Farnsworth | H05H 1/03 376/105 |
| 3,386,883 A | 6/1968 | Farnsworth | |
| 3,530,036 A * | 9/1970 | Hirsch | H05H 1/03 376/145 |
| 3,533,910 A | 10/1970 | Hirsch | |
| 4,129,772 A * | 12/1978 | Navratil | H05H 1/54 219/121.36 |
| 4,172,008 A * | 10/1979 | Fleet | G21B 1/15 376/127 |
| 4,182,651 A * | 1/1980 | Fischer | G21B 1/03 976/DIG. 3 |
| 4,246,067 A * | 1/1981 | Linlor | G21B 3/006 376/127 |
| 4,529,571 A * | 7/1985 | Bacon | H01J 27/14 376/108 |

(Continued)

FOREIGN PATENT DOCUMENTS

| | | |
|---|---|---|
| CA | 0002310071 A1 | 5/1999 |
| RU | 2128374 C1 | 3/1999 |

(Continued)

OTHER PUBLICATIONS

Georgia State University. The Department of Physics and Astronomy. HyperPhysics. 2016. http://hyperphysics.phy-astr.gsu.edu/ hbase/ NucEne/coubar.html (Year: 2016).*

(Continued)

*Primary Examiner* — Lily C Garner
(74) *Attorney, Agent, or Firm* — Peter K. Trzyna, Esq.

(57) ABSTRACT

Articles of manufacture, machines, processes for using the articles and machines, processes for making the articles and machines, and products produced by the process of making, along with necessary intermediates, directed to the transport of ion beams.

18 Claims, 18 Drawing Sheets

(56) References Cited

U.S. PATENT DOCUMENTS

| | | | |
|---|---|---|---|
| 4,639,348 | A | 1/1987 | Jarnagin |
| 4,682,564 | A * | 7/1987 | Cann ................... H05H 1/54 |
| | | | 118/721 |
| 4,894,199 | A * | 1/1990 | Rostoker ............... G21B 3/006 |
| | | | 376/139 |
| 4,949,011 | A | 8/1990 | Mann |
| 5,078,950 | A * | 1/1992 | Bernadet ................ H05H 3/06 |
| | | | 376/116 |
| 5,104,610 | A * | 4/1992 | Bernardet .............. H05H 3/06 |
| | | | 376/116 |
| 5,818,891 | A | 10/1998 | Rayburn et al. |
| 6,523,338 | B1 * | 2/2003 | Kornfeld ................ H05H 1/54 |
| | | | 60/202 |
| 6,617,775 | B1 * | 9/2003 | Seward, III .............. H05H 1/12 |
| | | | 313/62 |
| 6,628,740 | B2 * | 9/2003 | Monkhorst ............ G21B 1/052 |
| | | | 313/62 |
| 6,922,455 | B2 * | 7/2005 | Jurczyk .................. H05H 3/06 |
| | | | 376/109 |
| 7,482,607 | B2 * | 1/2009 | Lerner .................... G21B 3/00 |
| | | | 250/493.1 |
| 8,129,656 | B2 * | 3/2012 | Reichmann ........... G21B 3/002 |
| | | | 219/121.36 |
| 8,153,958 | B2 * | 4/2012 | Wu ......................... H05H 3/02 |
| | | | 250/503.1 |
| 9,543,052 | B2 | 1/2017 | Jackson |
| 10,421,412 | B2 | 10/2019 | Akinwande et al. |
| 10,770,186 | B2 * | 9/2020 | Goldberg ................ G21B 1/17 |
| 2003/0152186 | A1 * | 8/2003 | Jurczyk .................. G21B 1/19 |
| | | | 376/109 |
| 2003/0173914 | A1 | 9/2003 | Yamashita |
| 2004/0213368 | A1 | 10/2004 | Rostoker |
| 2005/0200256 | A1 * | 9/2005 | Adamenko .............. H05H 7/00 |
| | | | 313/238 |
| 2007/0023648 | A1 | 2/2007 | Baba |
| 2007/0045533 | A1 | 3/2007 | Krutchinsky et al. |
| 2007/0114380 | A1 | 5/2007 | Jackson |
| 2007/0114381 | A1 * | 5/2007 | Jackson ................. G21K 1/087 |
| | | | 250/284 |
| 2008/0089460 | A1 * | 4/2008 | Sved ........................ G21G 1/10 |
| | | | 376/195 |
| 2008/0155985 | A1 | 7/2008 | Labrador |
| 2008/0187086 | A1 | 8/2008 | Bussard et al. |
| 2009/0206064 | A1 * | 8/2009 | Reichmann ........... G21B 3/002 |
| | | | 219/121.59 |
| 2010/0072362 | A1 | 3/2010 | Giles et al. |
| 2011/0007860 | A1 | 1/2011 | Sanders, Jr. et al. |
| 2011/0286563 | A1 | 11/2011 | Moses et al. |
| 2013/0127376 | A1 | 5/2013 | Heid |
| 2013/0221216 | A1 | 8/2013 | Makarov et al. |
| 2013/0294558 | A1 | 11/2013 | Schulte |
| 2016/0005582 | A1 | 1/2016 | Verenchikov |
| 2016/0189816 | A1 * | 6/2016 | Czerwinski ............ G21C 19/42 |
| | | | 376/189 |
| 2016/0216400 | A1 * | 7/2016 | Navarro-Sorroche ... G01V 5/10 |
| 2017/0011811 | A1 * | 1/2017 | Slough ..................... H05H 1/14 |
| 2017/0025190 | A1 | 1/2017 | Gibson |
| 2017/0125129 | A1 | 5/2017 | Hora et al. |
| 2017/0221694 | A1 | 8/2017 | Papanastasiou et al. |
| 2017/0294238 | A1 | 10/2017 | Zheng |
| 2017/0323691 | A1 * | 11/2017 | Gorski .................... G21B 1/15 |
| 2018/0102191 | A1 | 4/2018 | Goldberg |
| 2019/0139650 | A1 | 5/2019 | Laberge et al. |
| 2020/0176133 | A1 | 6/2020 | Ooyama |
| 2020/0176135 | A1 | 6/2020 | Shihao |
| 2021/0252325 | A1 | 8/2021 | Corrigan et al. |
| 2022/0189647 | A1 | 6/2022 | Jackson |
| 2023/0101575 | A1 * | 3/2023 | Jackson ................. H01J 49/147 |
| | | | 250/283 |
| 2023/0187090 | A1 | 6/2023 | Jackson et al. |
| 2023/0232522 | A1 * | 7/2023 | Burgener, II ........... G21B 3/004 |
| | | | 315/246 |
| 2023/0352195 | A1 * | 11/2023 | Jackson ................... G21D 5/08 |
| 2024/0290507 | A1 * | 8/2024 | Wallace-Smith ........ G21B 1/19 |

FOREIGN PATENT DOCUMENTS

| | | | | |
|---|---|---|---|---|
| RU | 2606642 C1 | 1/2017 | | |
| WO | WO-2013166505 A2 * | 11/2013 | ............. | G21F 9/308 |
| WO | 2020185376 A1 | 9/2020 | | |
| WO | 2022031361 A2 | 2/2022 | | |
| WO | 2022046953 A2 | 3/2022 | | |

OTHER PUBLICATIONS

ITER. What Will ITER Do? 2020. < https://www.iter.org/sci/Goals>. (Year: 2020).*

Dylla, H. Frederick. "How Long is the Fuse on Fusion ?. " Scientific Journeys. Springer, Cham, 2020. 83-88. (Year: 2020).*

"Response and Amended Description" filed Aug. 28, 2024 in Canadian Patent Application No. 3, 178,871. Titled: "Ion Source". Beam Alpha, Inc. Cassan Maclean IP Agency Inc. pp. 1-37. Canada.

"Examiner's Report" for Canadian Application No. 3, 178,742. Titled: "Sulfur Blanket". Beam Alpha, Inc. May 21, 2024. Canadian Intellectual Property Office. pp. 1-5. Canada.

"Claims Amendment" for Australian Application. PCT Application No. PCT/US2021/036092. Titled: "Sulfur Blanket". Beam Alpha, Inc. filed Dec. 5, 2022 . pp. 1-17. IP Australia.

"Claims Amendment" for Singapore Application No. 11202260876V. Titled: "Sulfur Blanket". Beam Alpha, Inc. filed Dec. 5, 2022 . pp. 1-19. Intellectual Property Office of Singapore.

"International Search Report" for PCT Patent Application No. PCT/US21/36115 Titled: "Ion Source". Beam Alpha, Inc. Sep. 27, 2021. pp. 1-3. PCT International Searching Authority.

"Written Opinion" for PCT Patent Application No. PCT/US21/36115 Titled: "Ion Source". Beam Alpha, Inc. Sep. 27, 2021. pp. 1-12. PCT International Searching Authority.

"International Preliminary Report on Patentability" for PCT Patent Application No. PCT/US21/36115 Titled: "Ion Source" Beam Alpha, Inc. Jan. 31, 2022. pp. 1-8. PCT International Searching Authority.

Gerardo, J. B. et al., "Electron-Beam Excitation of Gas Lasers", International Topical Conference on Electron Beam Research & Technology, Albuquerque, NM, USA, Nov. 3-5, 1975, pp. 169-192, https://ieeexplore.ieee.org/document/6397723, 1975.

"Extended European Search Report" for European Patent Application No. 21822733.8. Titled: "Ion Source". Beam Alpha, Inc. Jun. 11, 2024. pp. 1-11. European Patent Office.

"Claims Amendment" for European Patent Application No. 21822733. 8. Titled: "Ion Source". Beam Alpha, Inc. filed Jan. 9, 2023. pp. 1-5, European Patent Office.

Herfurth F et al: "A linear radiofrequency ion trap for accumulation, bunching, and emittance improvement of radioactive ion beams", Nuclear Instruments & Methods in Physics Research. Section A, Elsevier Bv * North-Holland, NL, val. 469, No. 2, Aug. 11, 2001 (Aug. 11, 2001), pp. 254-275, XP004299029, ISSN: 0168-9002, DOI: 10.1016/S0168-9002(01)00168-1.

Dieter Gerlich: "On the Combination of a Low Energy Hydrogen Atom Beam With a Cold Multipole Ion Trap", Dec. 9, 2008 (Dec. 9, 2008), pp. 1-144, XP093169321.

Andelkovic Zoran et al: "Development of the HITRAP cooling trap and the EBIT offline ion source", Hyperfine Interactions, Publishing, Cham, Springer International val. 240, No. 1, Jun. 12, 2019 (Jun. 12, 2019), pp. 1-9, XP036804322, ISSN: 0304-3843, DOI: 10.1007/S10751-019-1605-8 [retrieved on Jun. 12, 2019].

Schramm U. et al: "Spatial Compression of Bunched Crystalline Ion Beams", Physica Scripta, val. T104, No. 1, Jan. 1, 2003 (Jan. 1, 2003), p. 189, XP0093162972, ISSN: 0031-8949, DOI: 10.1238/Physica.Topical 104a00189. Retrieved from the Internet: URL:https://iopscience.iop.org/article/10.1238/Physica.Topical. 104a00189/ pdf.

Wayne Mitano et al: "Cooling methods in ion traps", Physica Scripta, val. T59, Jan. 1, 1995 (Jan. 1, 1995), pp. 106-120, XP0055613209, GB ISSN: 0031-8949, DOI: 10.1088/0031-8949/1995/T59/013.

(56) References Cited

OTHER PUBLICATIONS

Helmut Wiedemann: "Transformation in Phase Space" In: "Particle Accelerator Physics", Jan. 1, 2015 (Jan. 1, 2015), XP093169358, ISBN: 978-3-319-18316-9 pp. 1-10, DOI: 10.1007/978-3-319-18317-6, Retrieved from the Internet: URL:https://link.springer.com/chapter/10.1007/978-3-319-18317-6_8.

S. Sels: "Doppler and sympathetic cooling for the investigation of short-lived radioactive ions", Physical Review Research, val. 4, No. 3, Sep. 1, 2022 (Sep. 1, 2022), XP093169304, College Park, US ISSN: 2643-1564, DOI: 10.1103/PhysRevResearch.4.033229.

"Examiner's Report" for Canadian Patent Application No. 3,178,871. Titled: "Ion Source". Beam Alpha, Inc. Apr. 29, 2024. pp. 1-7. Canadian Intellectual Patent Office. Canada.

"Preliminary Amendment" for U.S. Appl. No. 17/926,614. Titled: "Ion Source". Beam Alpha, Inc. filed Nov. 20, 2022. pp. 1-9. USPTO.

"Application as filed" for Canadian Patent Application No. 3,178,871. Titled: "Ion Source". Beam Alpha, Inc. Nov. 15, 2022. pp. 1-15. Canadian Intellectual Patent Office. Canada.

"Second Preliminary Amendment" for U.S. Appl. No. 17/926,614. Titled: "Ion Source". Beam Alpha, Inc. filed May 22, 2023. pp. 1-8. USPTO.

"International Search Report and Written Opinion" for PCT Patent Application No. PCT/US21/47625 Titled: "Mixed Nuclear Power Conversion". Beam Alpha, Inc. Nov. 16, 2022. pp. 1-2. PCT International Searching Authority.

"Written Opinion" for PCT Patent Application No. PCT/US21/47625 Titled: "Mixed Nuclear Power Conversion". Beam Alpha, Inc. Nov. 16, 2022. pp. 1-18. PCT International Searching Authority.

"International Preliminary Report on Patentability" for PCT Patent Application No. PCT/US21/47625 Titled: "Mixed Nuclear Power Conversion". Beam Alpha, Inc. Nov. 16, 2022. pp. 1-16. PCT International Searching Authority.

"Office Action" for European Application No. 21862687.7. Titled: "Mixed Nuclear Power Conversion". Beam Alpha, Inc. Jul. 5, 2024. European Patent Office. pp. 1-4. Europe.

"Claims Amendment" for European Application No. 21862687.7. Titled: "Mixed Nuclear Power Conversion". Beam Alpha, Inc. filed Mar. 13, 2023. European Patent Office. pp. 1-10. Europe.

"Claims Amendment" for Canadian Application No. 3,182,303 . Titled: "Mixed Nuclear Power Conversion". Beam Alpha, Inc. filed Dec. 12, 2022. European Patent Office. pp. 1-17. Canadian Patent Office.

"Claims Amendment" for Japanese Application No. 2023-511604. Titled: "Mixed Nuclear Power Conversion". Beam Alpha, Inc. filed Feb. 13, 2023. European Patent Office. pp. 1-53. Japan.

Goldberg, Murrey D. and Le Blanc, James M. "Angular Distributions of the D (d, n)He3 Reaction for 5- to 12-Mev Deuterons" Phys. Rev. vol. 119, No. 6. Sep. 15, 1960. Lawrence Radiation Laboratory, University of California. pp. 1-8.

Goldberg, M.D., et al. "Angular Distributions of T(p, n)He3 Neutrons for 3.4- to 12.4-Mev Proto" Phys. Rev. 122, 1510—Published Jun. 1, 1961. Physical Review Journals Archive.

"The global fusion industry in 2024. The global fusion industry in 2024 Fusion Companies Survey by the Fusion Industry Association." pp. 1-48. US.

R.L. Hirsch, "Inertial-Electrostatic Confinement of Ionized Fusion Gases", J. Appl. Phys. 38,4522 (1967). DOI: 10.1063/1.1709162.

G. Serianni, et al., "Neutralisation and Transport of Negative Ion Beams: Physics and Diagnostics", New J. Phys. 19 045003 (2017). DOI: 10.1088/1367-2630/aa64bd.

W.C. Elmore, et al., "On the Inertial-Electrostatic Confinement of a Plasma", Phys. Fluids 2, 239 (1959). DOI: 10.1063/1.1705917.

D.C. Barnes and R.A. Nebel, "Stable, Thermal Equilibrium, Large-Amplitude, Spherical Plasma Oscillations in Electrostatic Confinement Devices", Phys. Plasmas 5, 2498 (1998). DOI: 10.1063/1.872933.

J. Park, et al., "Experimental Observation of a Periodically Oscillating Plasma Sphere in a Gridded Inertial Electrostatic Confinement Device", Phys. Rev. Lett. 95, 015003 (2005). DOI: 10.1103/PhysRevLett.95.015003.

Y. Gu, et al., "Pulsed Operation of Spherical Inertial-Electrostatic Confinement Device", Fusion Tech. 30, 1342 (1996). DOI: 10.13182/FST96-A11963135.

V.N. Goncharov, et.al., "Demonstration of the Highest Deuterium-Tritium Areal Density using Multiple-Picket Cryogenic Designs on OMEGA," Phys. Rev. Lett. 104, 165001 (2010). DOI: 10.1103/PhysRevLett.104.165001.

G.H. Miley, et al., "Discharge Characteristics of the Spherical Inertial Electrostatic Confinement (IEC) Device", IEEE Trans. Plasma Sci. 25, No. 4, 733-9 (1997). DOI: 10.1109/27.640696.

M.K. Michalak, G.L. Kulcinski, and J.F. Santarius, "Exploring Non-Uniformities in Gun-to-Gun Performance on the Six Ion gun Fusion experiment (SIGFE)", Presented at the 14th U.S.-Japan IEC Workshop, College Park MD (2012). http://fti.neep.wisc.edu/presentations/michalak_iec2012.pdf.

R.L. Hirsch, "Experimental Studies of a Deep, Negative, Electrostatic Potential Well in Spherical Geometry", Phys. Fluids 11, 2486 (1968). DOI: 10.1063/1.1691842.

https://www.iaea.org/newscenter/news/what-is-nuclear-fusion.
https://www-nds.iaea.org/exfor/.
https://www.energy.gov/articles/doe-national-laboratory-makes-history-achieving-fusion-ignition.
https://www.youtube.com/watch?v=Wh5TUIzBwLw.
https://www.youtube.com/watch?v=t5wntLZCcYA.
https://www.madisonstartups.com/shine-phoenix-set-world-record/.
https://www.shinefusion.com/.

"Amendment and Response After Final" filed Oct. 2, 2024, in U.S. Appl. No. 17/433,924. Titled "Direct Nuclear Power Conversion". Beam Alpha, Inc. USPTO. pp. 1-75.

"Office Action-Final Rejection" issued Sep. 5, 2024, in U.S. Appl. No. 17/433,924. Titled "Direct Nuclear Power Conversion". Beam Alpha, Inc. USPTO. pp. 1-54.

"Second Declaration of Gerald Peter Jackson" dated Sep. 30, 2024. Gerald Peter Jackson. pp. 1-14.

"Reply to Rule 63(1) EPC" filed Sep. 5, 2024, in European Patent Application No. 21862687.7. Titled "Mixed Nuclear Power Conversion" for Beam Alpha, Inc. European Patent Office. pp. 1-7.

"Amendment and Response to Extended European Search Report" filed Oct. 7, 2024, in European Patent Application No. 21854417.9. Titled "Sulfur Blanket" for Beam Alpha, Inc. European Patent Office. pp. 1-47.

"Amendment and Response to Examiner's Report" filed Sep. 19, 2024, in Canadian Patent Application No. 3,178,742. Titled "Sulfur Blanket" for Beam Alpha, Inc. Canadian Intellectual Property Office. pp. 1-60.

Najmabadi, F et al., "fusion reactor." Encyclopedia Britannica. https://www.britannica.com/technology/fusion-reactor. 2024. (Year: 2024).

Conn, R. "fusion reactor." Encyclopedia Britannica. https://www.britannica.com/science/nuclear-fusion. 2024. (Year: 2024).

"Brief on Appeal on Behalf of Appellant" for U.S. Appl. No. 17/433,924, Titled: "Direct Nuclear Power Conversion". Beam Alpha, Inc., filed Feb. 4, 2025. pp. 1-145.

"Evidence Appendix" for U.S. Appl. No. 17/433,924, Titled: "Direct Nuclear Power Conversion". Beam Alpha, Inc., filed Feb. 4, 2025. pp. 1-131.

https://www.energy.gov/science/doe-explainsfusion-reactions "DOE Explains...Fusion Reactions".
https://www.energy.gov/articles/how-particle-accelerators-work "How Particle Accelerators Work".
https://www.energy.gov/doe-fusion-energy-strategy-2024-executive-summary "DOE Fusion Energy Strategy 2024, Executive Summary".
https://www.energy.gov/sites/default/files/2024-06/fusion-energy-strategy-2024.pdf.
https://en.wikipedia.org/wiki/Ivy_Mike "Ivy Mike".
https://en.wikipedia.org/wiki/Fusor "Fusor".

(56) References Cited

OTHER PUBLICATIONS https://en.wikipedia.org/wiki/List_of_fusor_examples "List of Fusor Examples".
https://www.shinefusion.com/ "Shine".
https://www.madisonstartups.com/shine-phoenix-set-world-record/ "SHINE, Phoenix Set World Record".
https://tracxn.com/d/companies/shine-technologies/_ZQoSc1dFIYDoHLZq1zb6SVMjrm6wyy9Nfx2Lqlewmxg/funding-and-investors "SHINE Medical raising $30 million Series C round".
https://cds.cern.ch/record/454179/files/p37.pdf "Sputter Pumps".
https://en.wikipedia.org/wiki/List_of_nuclear_power_stations "List of nuclear power stations".
http://web.archive.org/web/20241110224913/https://www.iter.org/few-lines "What is ITER?".
https://en.wikipedia.org/wiki/Colliding_beam_fusion#.
"International Search Report" for PCT Patent Application No. PCT/US20/19449 Titled: "Direct Nuclear Power Conversion". Beam Alpha, Inc. Sep. 21, 2020. pp. 1-2. PCT International Searching Authority.
"Written Opinion of the International Searching Authority" for PCT Patent Application No. PCT/US20/19449 Titled: "Direct Nuclear Power Conversion". Beam Alpha, Inc. Sep. 21, 2020. pp. 1-9. PCT International Searching Authority.
"International Preliminary Report on Patentability" for PCT Patent Application No. PCT/US20/19449 Titled: "Direct Nuclear Power Conversion". Beam Alpha, Inc. Nov. 29, 2020. pp. 1-39. PCT International Searching Authority.
Ruggiero, "Nuclear fusion of protons with boron", Brookhaven National Lab,, No. BNL-47989; CONF-9209103--1, https://www.osti.gov/servlets/purl/6911764, 1992.
"Amendment and Response" for PCT Patent Application No. PCT/US20/19449 Titled: "Direct Nuclear Power Conversion". Beam Alpha, Inc., filed Oct. 27, 2020. pp. 1-19.
"Communication pursuant to Rules 70(2) and 70a(2) EPC" for European Application No. 20770753.0. Titled: "Direct Nuclear Power Conversion". Beam Alpha, Inc. Feb. 28, 2023. European Patent Office. pp. 1-1. Europe.
"Theory of Secondary Electron Emission by High-Speed Ions" by E.J. Sternglass published in Physical Review, vol. 108, issue No. 1, pp. 1-12 on Oct. 1, 1957.
"Electron Emission from Molybdenum Under Ion Bombardment" by J. Ferron et al. published in Journal of Physics D: Applied Physics, vol. 14, pp. 1707-1720 in 1981.
"Secondary Electron Yields from Clean Polycrystalline Metal Surfaces Bombarded by 5-20 keV Hydrogen or Noble Gas Ions" by P.C. Zalm and L.J. Beckers published in the Phillips Journal of Research, vol. 39, pp. 61-76 in 1984.
"Secondary Electron Emission Produced by Relativistic Primary Electrons" by A.A. Schultz and M.A. Pomerantz published in The Physical Review, vol. 130, issue No. 6, pp. 2135-2141 on Jun. 15, 1963.
https://en.wikipedia.org/wiki/Collider#History.
"Response and Amended Claims" for European Application No. 20770753.0. Titled: "Direct Nuclear Power Conversion". Beam Alpha, Inc. Apr. 29, 2022. pp. 1-7. Europe.
https://en.wikipedia.org/wiki/Antiproton_Accumulator.
"European Search Report" for European Application No. 20770753.0. Titled: "Direct Nuclear Power Conversion". Beam Alpha, Inc. Feb. 10, 2023. European Patent Office. pp. 1-9. Europe.
Jowett, J. M., Schaumann, M. and Versteegen, R., 'Heavy-Ion Operation of HL-LHC', The High Luminosity Large Hadron Collider, chapter 21, pp. 359-371, 2015.
"Invitation pursuant to Rule 63(1) EPC" for European Application No. 20770753.0. Titled: "Direct Nuclear Power Conversion". Beam Alpha, Inc. Oct. 12, 2022. European Patent Office. pp. 1-4. Europe.
"Amended Claims" for European Application No. 20770753.0. Titled: "Direct Nuclear Power Conversion". Beam Alpha, Inc. Dec. 22, 2022. pp. 1-7. Europe.
"Reply to Rule 63(1) EPC Communication" for European Application No. 20770753.0. Titled: "Direct Nuclear Power Conversion". Beam Alpha, Inc. Dec. 22, 2022. European Patent Office. pp. 1-5. Europe.
"Communication pursuant to Rules 161(2) and 162 EPC" for European Application No. 20770753.0. Titled: "Direct Nuclear Power Conversion". Beam Alpha, Inc. Dec. 20, 2021. European Patent Office. pp. 1-3. Europe.
"Amendment and Reply" for European Application No. 20770753.0. Titled: "Direct Nuclear Power Conversion". Beam Alpha, Inc. Sep. 11, 2023. European Patent Office. pp. 1-15. Europe.
Reddie & Grose. "EPO Correction Letter" for European Application No. 20770753.0. Titled: "Direct Nuclear Power Conversion". Beam Alpha, Inc. Jun. 11, 2024. European Patent Office. pp. 1-15. Pete Sadler. Europe.
"Examiner's Report" for Canadian Patent Application No. 3,131,901. Titled: "Direct Nuclear Power Conversion". Beam Alpha, Inc. Mar. 27, 2023. Canadian Intellectual Patent Office. pp. 1-5. Canada.
"Examiner's Report" for Canadian Patent Application No. 3,131,901. Titled: "Direct Nuclear Power Conversion". Beam Alpha, Inc. Feb. 15, 2024. Canadian Intellectual Patent Office. pp. 1-4. Canada.
Rider, "A General Critique of Inertial-Electrostatic Confinement Fusion Systems", Thesis, MIT Department of Nuclear Engineering, https://dspace.mit.edu/handle/1721.1/29869, 1991.
Anon, "Wikipedia Article, "Fusors", "losses"", https://en.wikipedia.org/wiki/Fusor#Losses, Feb. 15, 2024.
"Response to Examiner's Report" for Canadian Patent Application No. 3,131,901. Titled: "Direct Nuclear Power Conversion". Beam Alpha, Inc. Jul. 26, 2023. Canadian Intellectual Patent Office. pp. 1-79. Canada.
"Response to Examiner's Report" for Canadian Patent Application No. 3,131,901. Titled: "Direct Nuclear Power Conversion". Beam Alpha, Inc. Jun. 14, 2024. Canadian Intellectual Patent Office. pp. 1-32. Canada.
"Examination Report No. 1" for Australian Patent Application No. 2020233809. Titled: "Direct Nuclear Power Conversion". Beam Alpha, Inc. Oct. 5, 2022. IP Australia. pp. 1-3. Australia.
Steerenberg, R., 'LHC Report: The LHC is full'. Published May 15, 2018. Retrieved from https://home.cern/news/news/ accelerators/lhc-report-lhc-full.
"Examination Report No. 2" for Australian Patent Application No. 2020233809. Titled: "Direct Nuclear Power Conversion". Beam Alpha, Inc. May 31, 2023. IP Australia. pp. 1-4. Australia.
"Response to Examiner's Report" for Australian Patent Application No. 2020233809. Titled: "Direct Nuclear Power Conversion". Beam Alpha, Inc. May 24, 2023. IP Australia. pp. 1-143. Australia.
"Response to Examiner's Report" for Australian Patent Application No. 2020233809. Titled: "Direct Nuclear Power Conversion". Beam Alpha, Inc. Aug. 2, 2023. IP Australia. pp. 1-145. Australia.
"Examination Report No. 3" for Australian Patent Application No. 2020233809. Titled: "Direct Nuclear Power Conversion". Beam Alpha, Inc. Aug. 10, 2023. IP Australia. pp. 1-4. Australia.
Amasa B. Bishop, Project Sherwood—The U.S. Program in Controlled Fusion, (Addison-Wesley Pub. Co. Inc., Reading MA, 1958). ISBN-13: 978-0201005752.
"Cost and Performance Characteristics of New Generating Technologies, Annual Energy Outlook 2019", U.S. Energy Information Administration (Jan. 2019) https://www.eia.gov/outlooks/aeo/assumptions/pdf/table_8.2.pdf.
R.S. Craxton, et al., "Direct-Drive Inertial Confinement Fusion: A Review", Phys. Plasmas 22, 110501 (2015). DOI: 0.1063/1.4934714.
J.D. Lindl, "Development of the Indirect-Drive Approach to Inertial Confinement Fusion and the Target Physics Basis for Ignition and Gain," Phys. Plasmas 2, 3933 (1995). DOI: 10.1063/1.871025.
J. D. Lindl, Inertial Confinement Fusion: The Quest for Ignition and Energy Gain Using Indirect Drive, (Springer-Verlag, New York, 1998). ISBN-13: 978-1563966620.
J.D. Lindl, et al., "The Physics Basis for Ignition Using Indirect-Drive Targets on the National Ignition Facility", Phys. Plasmas 11, 339 (2004). DOI: 10.1063/1.1578638.
R.L. Hirsch, "Inertial-Electrostatic Confinement of Ionized Fusion Gases", J. Appl. Phys. 38,4522 (1967). DOI: 10.1063/1.1709162.

(56) References Cited

OTHER PUBLICATIONS

G.H. Miley and S.K. Murali, Inertial Electrostatic Confinement (IEC) Fusion: Fundamentals and Applications, (Springer-Verlag, New York, 2014). ISBN-13: 978-1461493372.

"Preliminary Amendment" for U.S. Appl. No. 17/433,924, Titled: "Direct Nuclear Power Conversion". Beam Alpha, Inc., filed Aug. 25, 2021. pp. 1-24.

"Amendment and Response" for U.S. Appl. No. 17/433,924, Titled: "Direct Nuclear Power Conversion". Beam Alpha, Inc., filed Aug. 8, 2024. pp. 1-71.

"Office Action" for U.S. Appl. No. 17/433,924, Titled: "Direct Nuclear Power Conversion". Beam Alpha, Inc., mailed Nov. 1, 2023. pp. 1-51.

"Office Action" for U.S. Appl. No. 17/433,924, Titled: "Direct Nuclear Power Conversion". Beam Alpha, Inc., mailed Feb. 8, 2024. pp. 1-46.

"International Search Report" for PCT Patent Application No. PCT/US21/36092 Titled: "Sulfur Blanket". Beam Alpha, Inc. Mar. 4, 2022. pp. 1-2. PCT International Searching Authority.

"Written Opinion" for PCT Patent Application No. PCT/US21/36092 Titled: "Sulfur Blanket". Beam Alpha, Inc. Mar. 4, 2022. pp. 1-9. PCT International Searching Authority.

"International Preliminary Report on Patentability" for PCT Patent Application No. PCT/US21/36092 Titled: "Sulfur Blanket". Beam Alpha, Inc. Mar. 4, 2022. pp. 1-6. PCT International Searching Authority.

"Extended European Search Report" for European Application No. 21854417.9 . Titled: "Sulfur Blanket". Beam Alpha, Inc. Apr. 17, 2024. European Patent Office. pp. 1-7. Europe.

"Amended Claims" for European Application No. 21854417.9. Titled: "Sulfur Blanket". Beam Alpha, Inc. filed Jan. 9, 2023. European Patent Office. pp. 1-8. Europe.

* cited by examiner

ION TRANSPORT

I. PRIORITY

This patent application claims priority from, and incorporates by reference as if fully stated herein, U.S. Patent Application Ser. No. 62/995,168 having the title "Transient Beam Compression Fusion" and filed Jan. 14, 2020 by the same inventor.

II. SUMMARY

The disclosure below uses different prophetic embodiments to teach the broader principles with respect to articles of manufacture, apparatuses, processes for using the articles and apparatuses, processes for making the articles and apparatuses, and products produced by the process of making, along with necessary intermediates, directed to ion transport.

This Summary is further provided to introduce the idea herein that a selection of concepts is presented in a simplified form as further described below. This Summary is not intended to identify key features or essential features of subject matter, nor this Summary intended to be used to limit the scope of claimed subject matter. Additional aspects, features, and/or advantages of examples will be indicated in part in the description which follows and, in part, will be apparent from the description, or may be learned by practice of the disclosure.

References sited herein are incorporated by reference as if fully stated herein. The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

III. INDUSTRIAL APPLICABILITY

Industrial applicability is representatively directed to that of apparatuses and devices, articles of manufacture, and processes of making and using them. Industrial applicability also includes industries, such as nuclear, engaged in the foregoing, as well as industries operating in cooperation therewith, depending on the implementation.

IV. DRAWINGS

In the non-limiting examples of the present disclosure, please consider the following:

Figure 7:
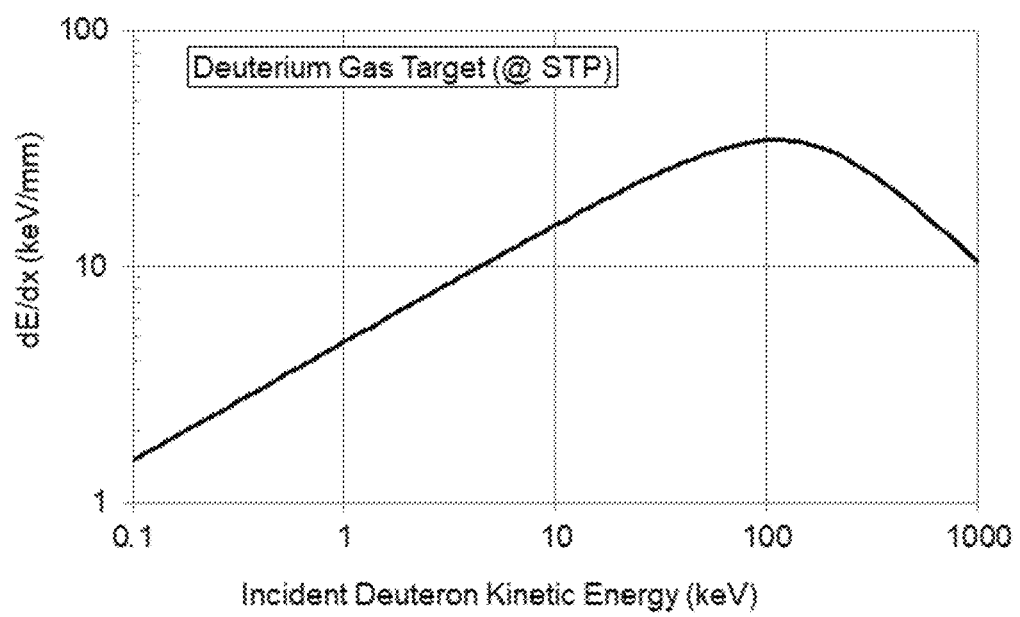
Figure 8:
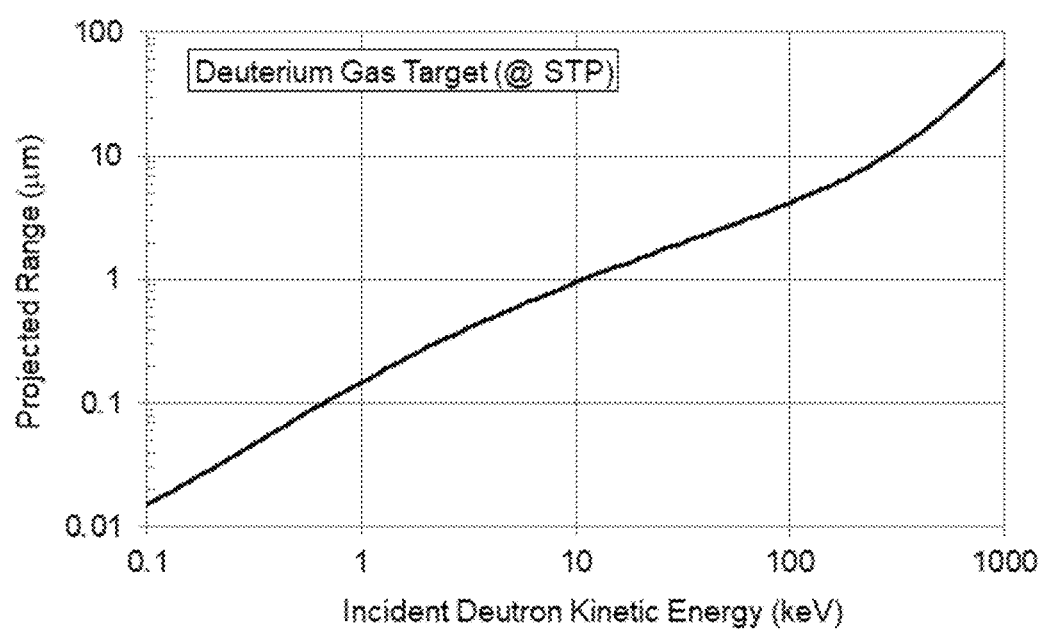
Figure 9:
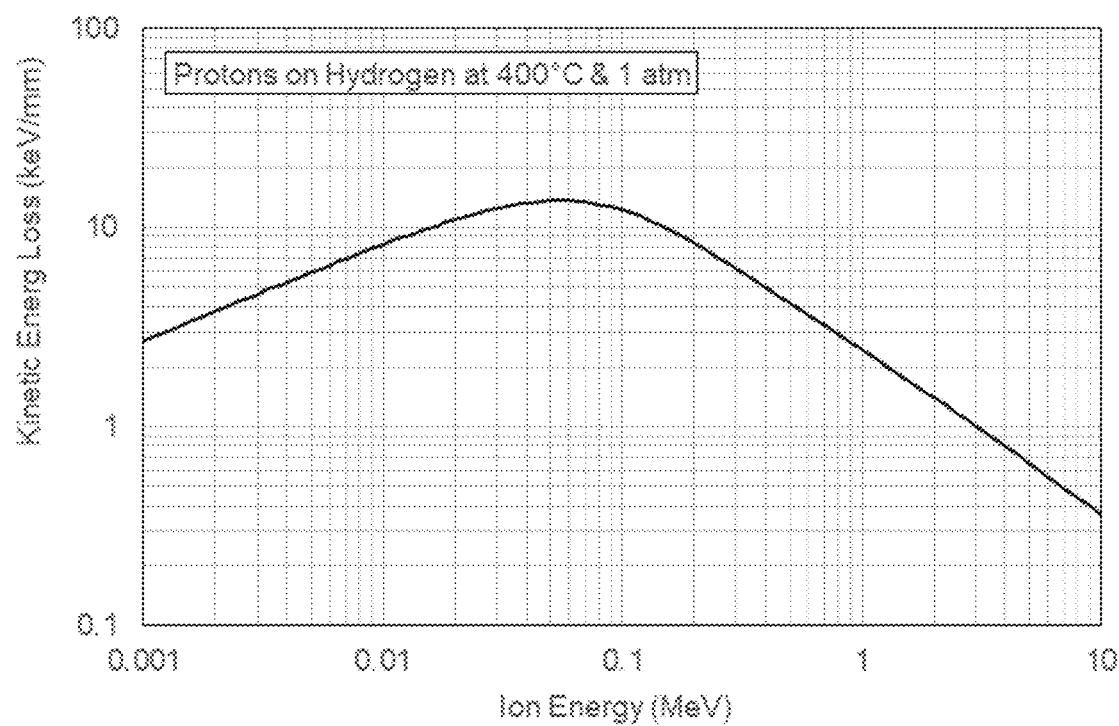
Figure 10:
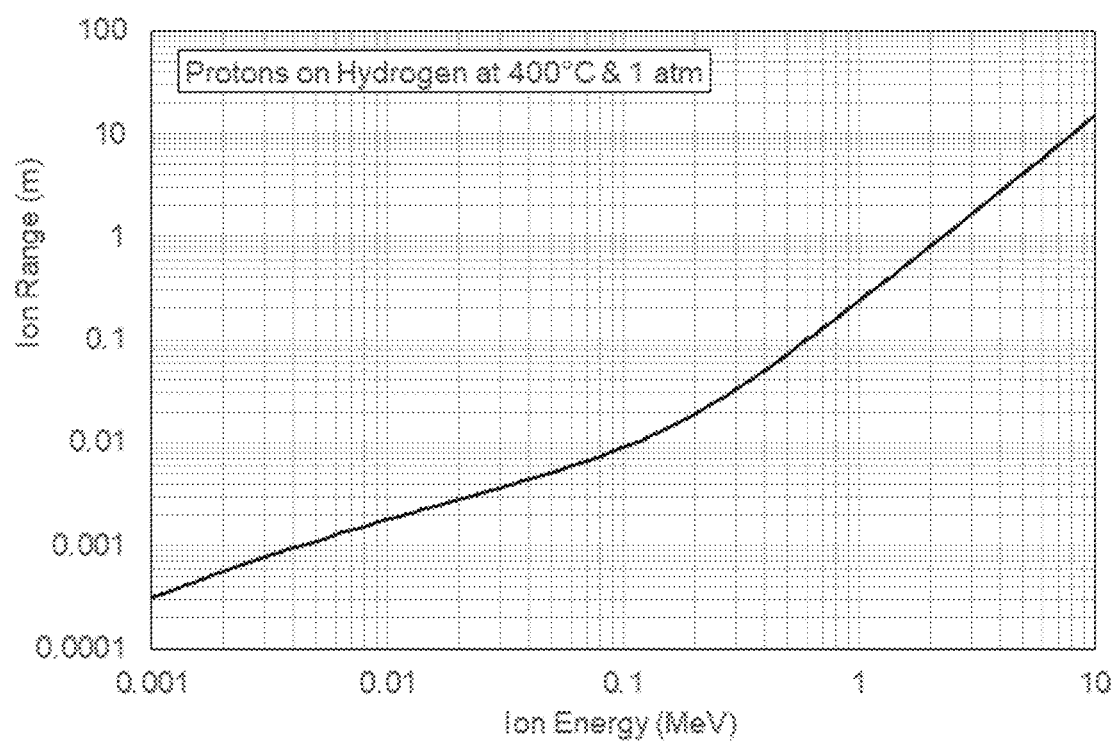
Figure 11:
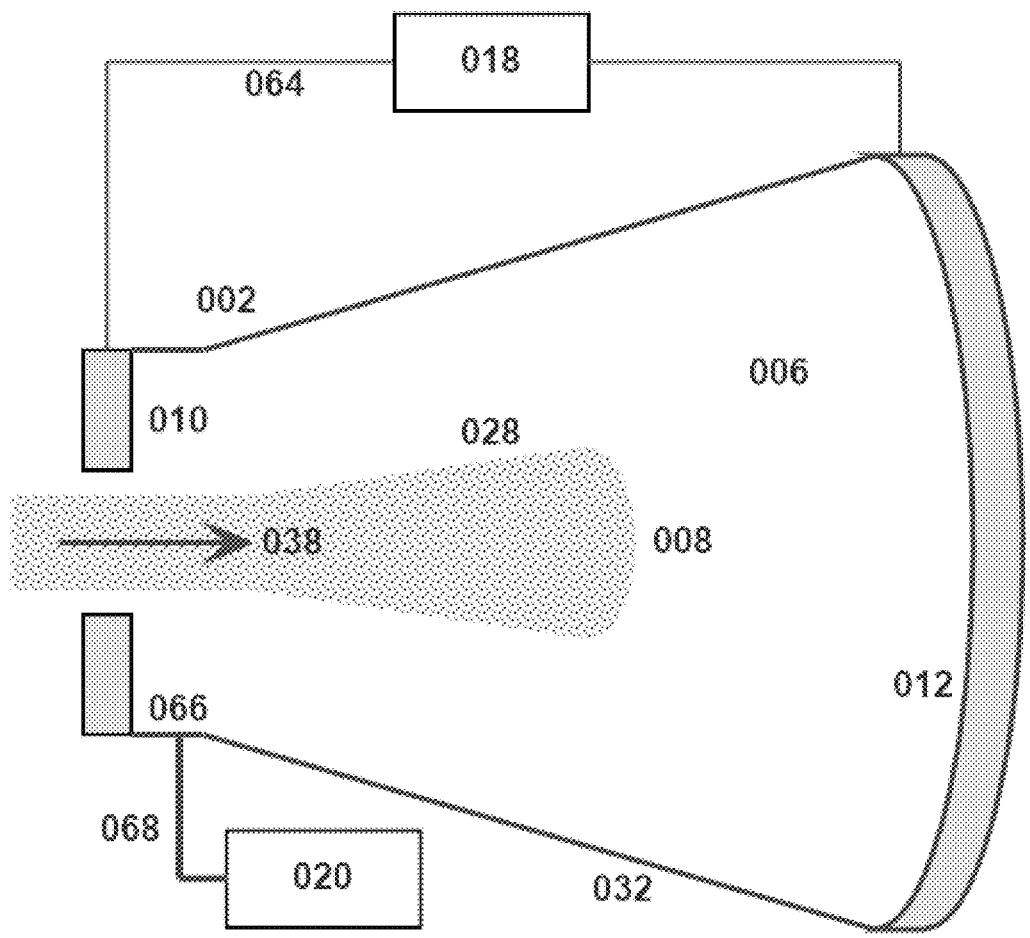
Figure 12:
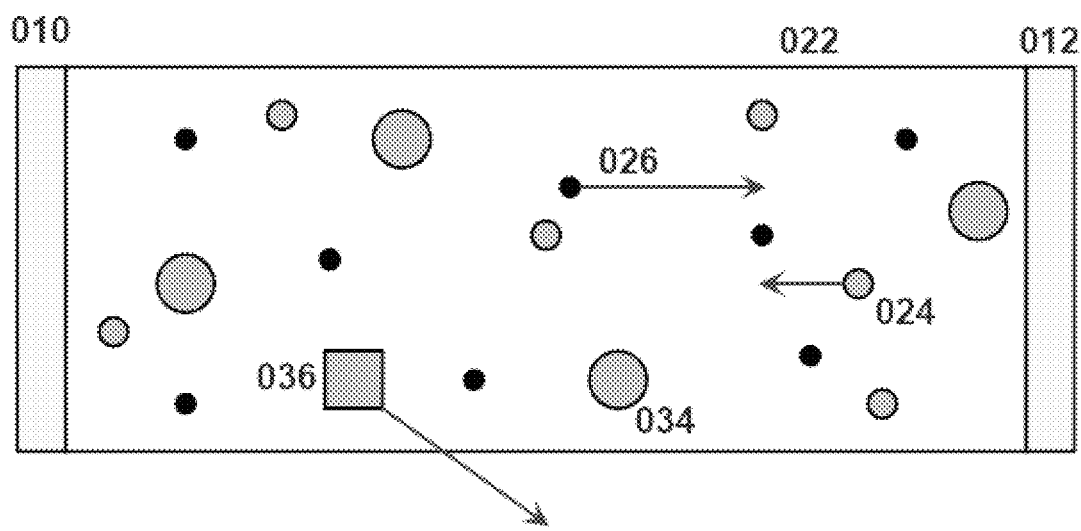
Figure 13:
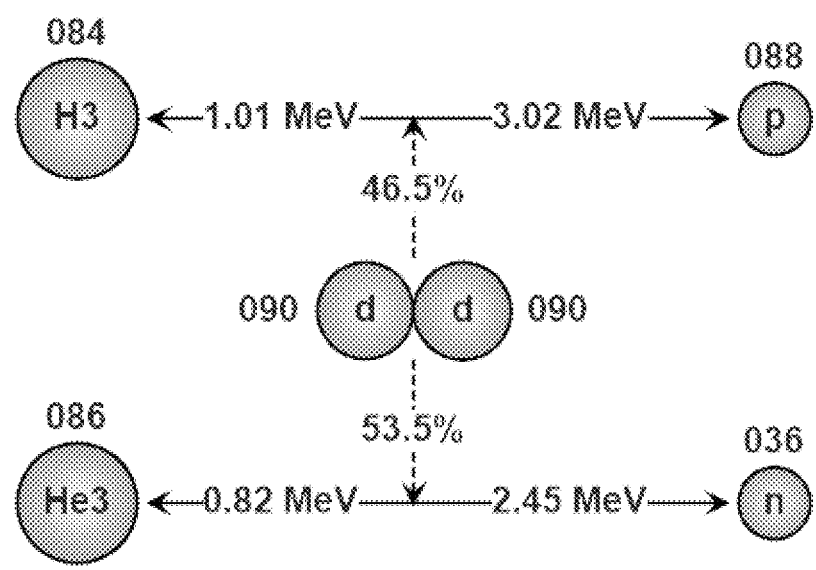
Figure 14:
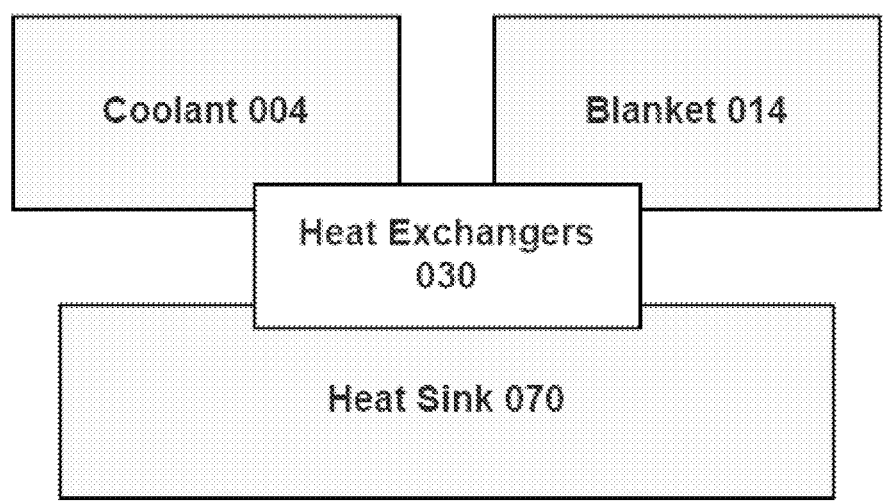
Figure 15:
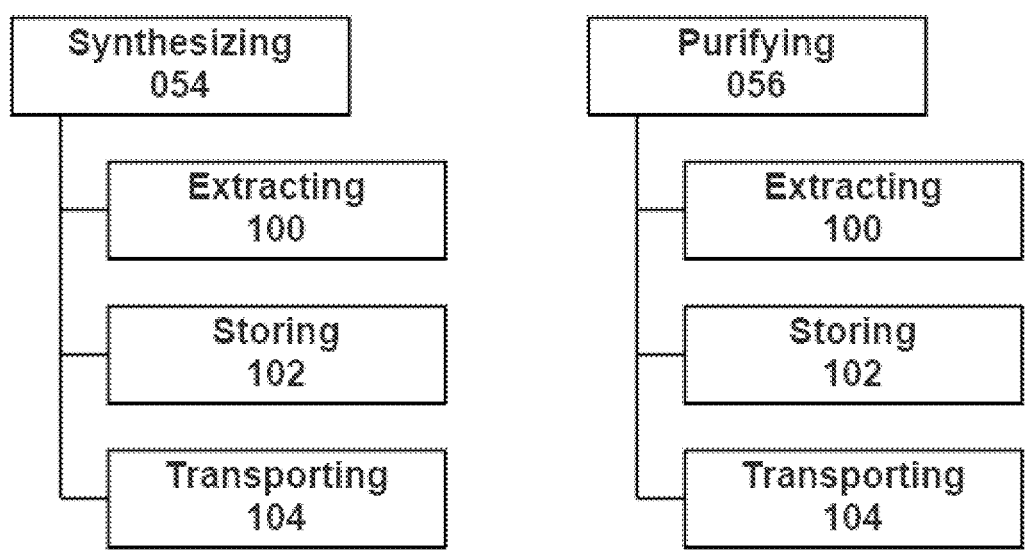
Figure 16:
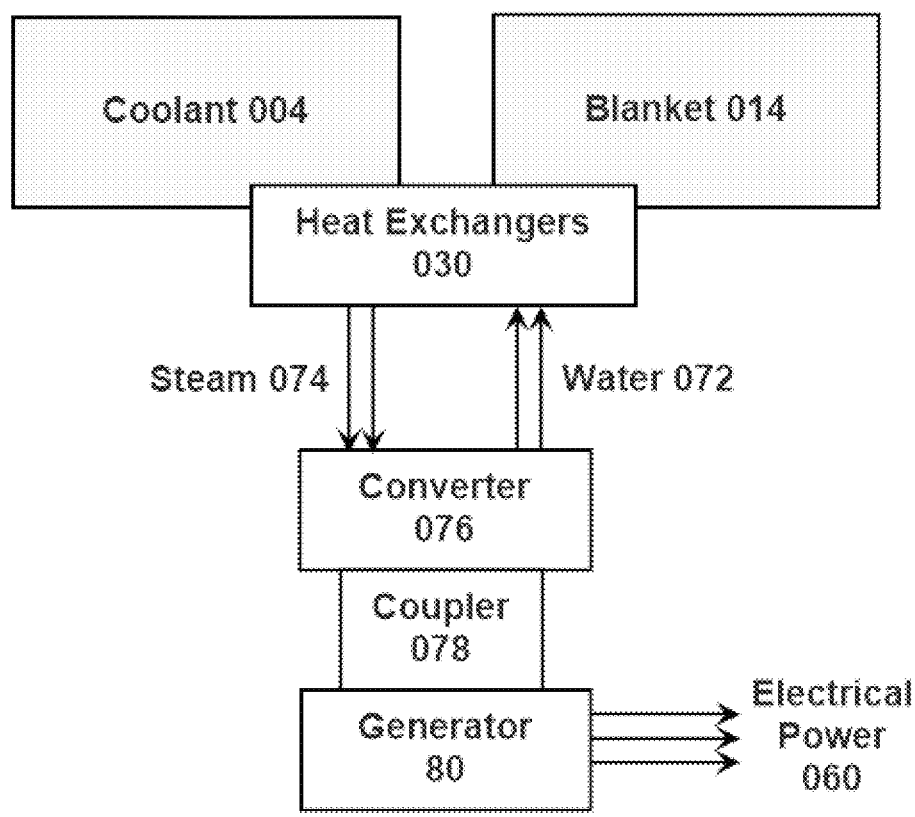
Figure 17:
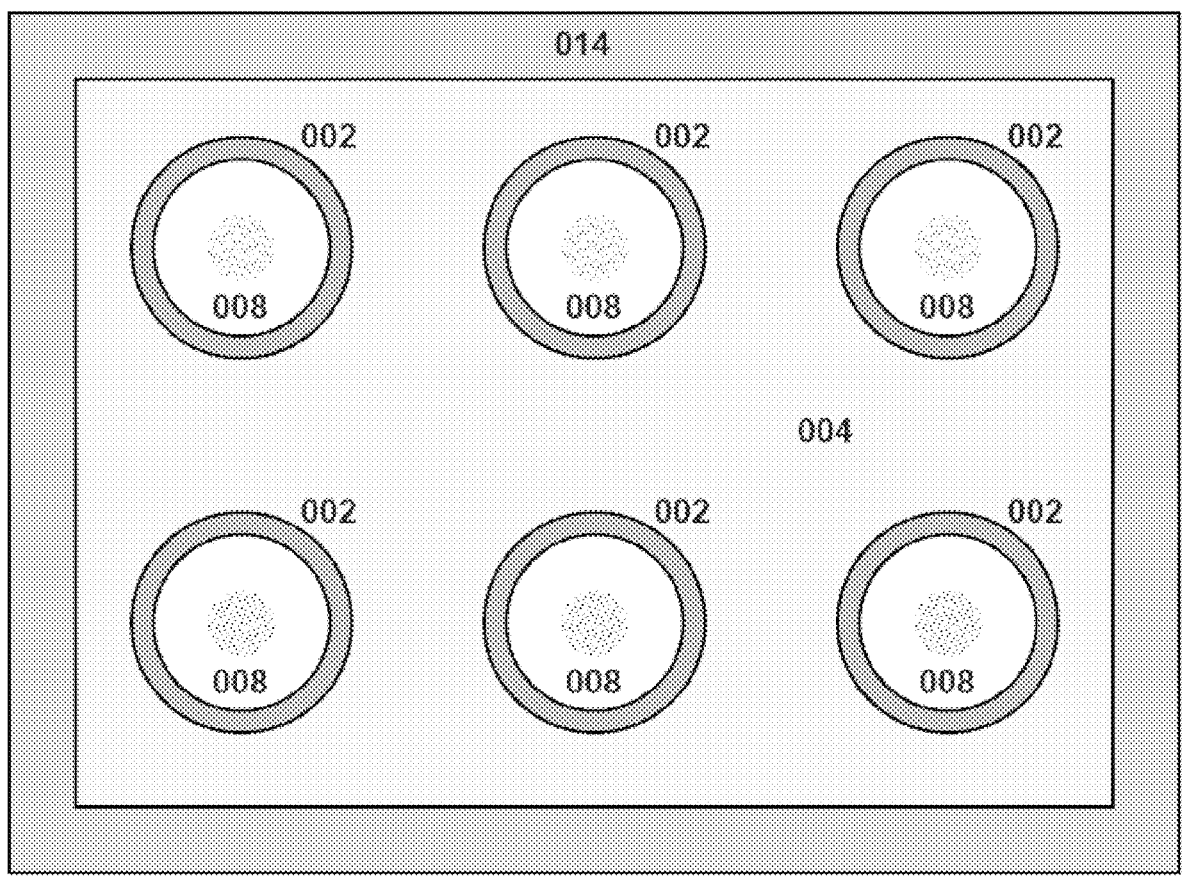
Figure 18:
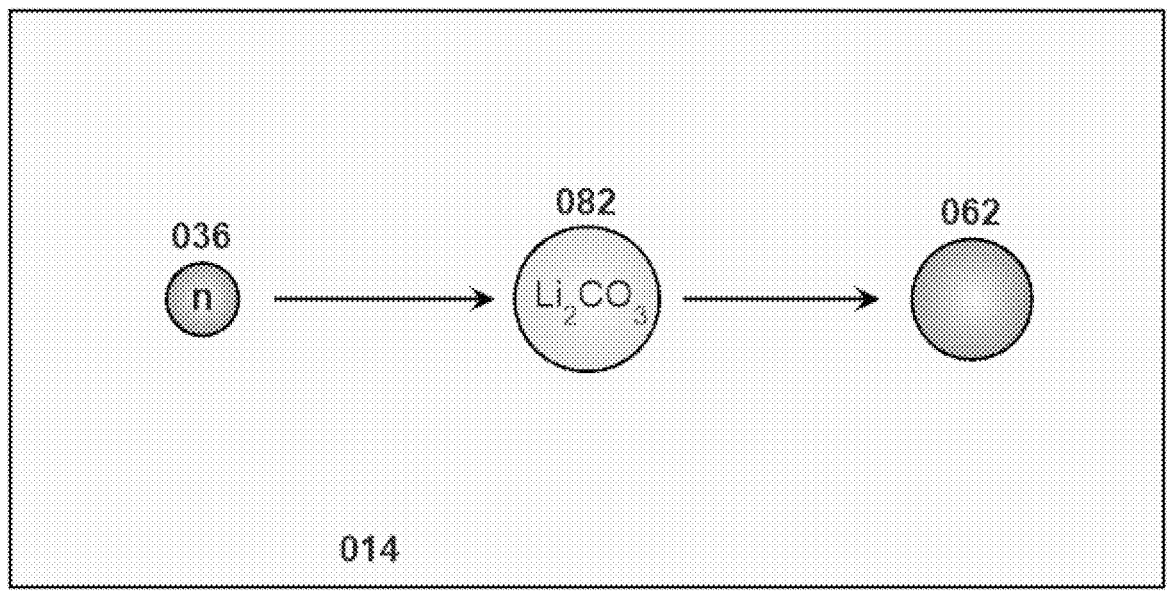

FIG. 7 contains a plot of the calculated deceleration rate (dE/dx) of an incident deuteron [090] through a sample of gas [034] comprising deuterium as a function of incident deuteron [090] kinetic energy;

FIG. 8 contains a plot of the calculated longitudinal range of an incident deuteron [090] through a sample of gas [034] comprising deuterium as a function of incident deuteron [090] kinetic energy;

FIG. 9 contains a plot of the calculated deceleration rate (dE/dx) of an incident proton [088] through a sample of gas [034] comprising hydrogen as a function of incident proton [088] kinetic energy;

FIG. 10 contains a plot of the calculated longitudinal range of an incident proton [088] through a sample of gas [034] comprising hydrogen as a function of incident proton [088] kinetic energy;

FIG. 11 is an illustration of energetic ions [028] in an ion beam [008]propagating [040] along a trajectory [038] into a chamber interior [006] wherein a power supply [018] applies a voltage between a cathode [010] and an anode [012];

FIG. 12 is an illustration of an electrical arc [022]. The arrows indicate velocity vectors associated with free electrons [026], gas ions [024], and neutrons [036];

FIG. 13 is an illustration of the inelastic collision of two hydrogen-2 nuclei [090] producing ions of hydrogen-3 [084], helium-3 [086], hydrogen-1 [088], and neutrons [036];

FIG. 14 is an illustration of the functional relationship between the coolant [004], the blanket [014], one or more heat exchangers [030], and a heat sink [070];

FIG. 15 is an illustration of methods comprising ion transport;

FIG. 16 is an illustration of one embodiment teaching electrical power [060] generation;

FIG. 17 is a sketch of multiple chambers [032] within a common bath of coolant [004];

FIG. 18 is an illustration of a lithium carbonate molecule [082] absorbing [048] a neutron [036] to synthesize [054] a predetermined isotope [062].

V. DETAILED DISCLOSURE OF MODES

Generally, when an energetic beam of ions passes through a region filled with a gas, collisions with the electrons in the gas cause the energetic ions to lose kinetic energy, eventually coming to thermal equilibrium with the gas molecules. Often, the beam loses kinetic energy too fast, falling below a threshold needed to perform a specific function. For example, in order for boron nuclei to penetrate silicon wafers down to a prescribed depth during the process of ion implantation, they must bombard the wafer surface at a specific kinetic energy. Unless the wafer is bombarded while positioned in a vacuum, the boron beam must penetrate through a surrounding gas, often air or argon. If surrounded by a gas, the boron ion accelerator must have an increased output energy in order to account for the deceleration caused by this surrounding gas, making the accelerator more expensive than necessary.

Beams of muons can be collided to precisely study the Higgs Particle. Such muon colliders are enabled by a process wherein beams of highly-divergent muons are sent through a gas to be cooled into a tight, coherent beam. Called ionization cooling, the process depends on the fact that muons lose energy in a gas in a manner very similar to energetic ions in an ion beam. On average, each muon loses kinetic energy in its respective direction of propagation, indicating the muon momenta, both in the forward beam direction and perpendicular, are also reduced. In ionization cooling, the gas is within a radiofrequency cavity that reaccelerates the muons in the forward direction, not the original direction of the muon. The net effect is constant forward momentum but a shrinking perpendicular momentum. This generates a more collimated muon beam, hence beam cooling. A problem with this approach is that the gas-filled radiofrequency cavities are prone to voltage breakdown due to gas ionization, such that an improvement is wanting, along with a need for alternative approaches.

Figure 1:
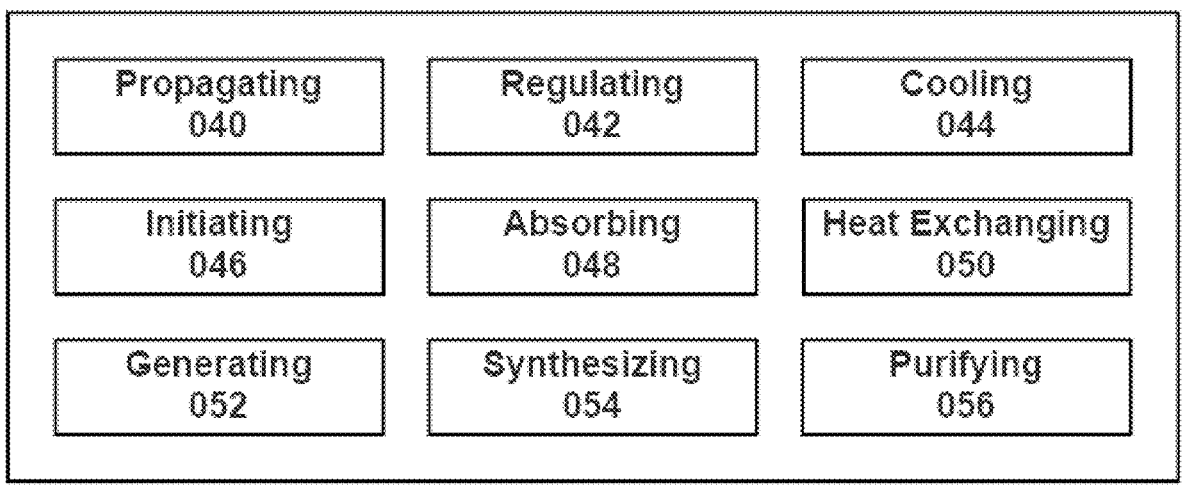
FIG. 1 is an illustration of a method of transporting ions.

The following detailed description is directed to concepts and technologies for transport of energetic ions [028], teaching by way of prophetic illustration. As illustrated in FIG. 1, the disclosure includes a process of transporting energetic ions [028], said process comprising: propagating [040] an ion beam [008] of energetic ions [028] through a chamber [032] that contains a gas [034]; regulating [042] pressure of said gas [034] in said chamber [032]; cooling [044] said chamber [032]; initiating [046] an electrical arc [022] within said chamber [032], said electrical arc [022] comprised of flowing gas ions [024] and free electrons [026], wherein said free electrons [026] within said electrical arc [022] are flowing; 1) in the same direction as said ion beam [008], 2) at an average velocity greater than or equal to an average velocity of said energetic ions [028], and 3) along paths at least in part spatially overlapping the trajectories of said energetic ions [028] within said ion beam [008]; absorbing [048] neutrons [036] created by said energetic ions [028] colliding with said flowing gas ions [024] and said gas [034]; and heat exchanging [050] thermal energy produced by said electrical arc [022] and said absorbing [048]. In another embodiment, this process also comprises generating [052] electrical power [060] with said thermal energy from said heat exchanging [050]. In yet another embodiment, this process also comprises synthesizing [054] one or more predetermined isotopes [062] with neutrons [036] from said absorbing [048]. In yet another embodiment, this process also comprises purifying [056] said gas [034] to remove one or more predetermined isotopes [062] from said chamber [032].

Figure 2:
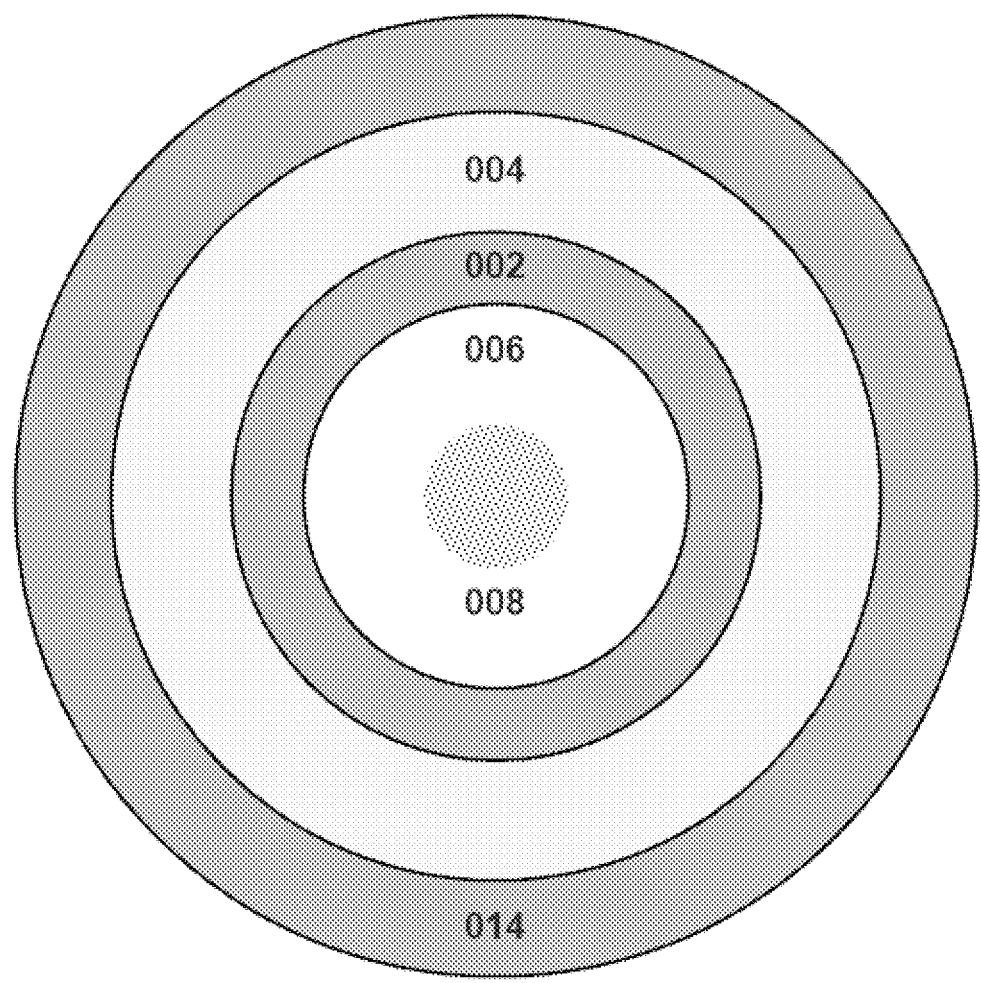
FIG. 2 is an end view illustration of a chamber [032] transporting energetic ions [028]
Figure 3:
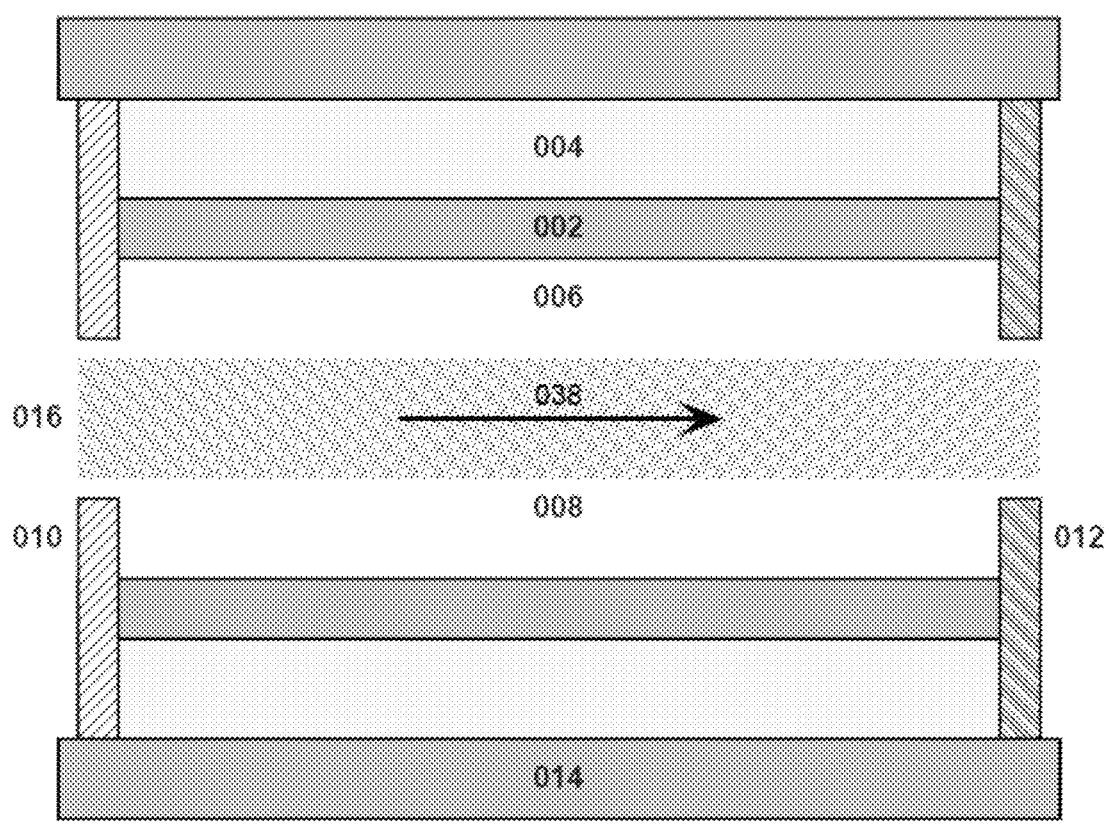
FIG. 3 is a side view illustration of a chamber [032] transporting energetic ions [028], wherein the arrow indicates the propagation direction of the energetic ions [028] and ion beam [008] trajectory [038]

The following disclosure includes a teaching of product produced by a process. Similarly, as illustrated in FIG. 2 and FIG. 3, the following disclosure teaches an apparatus to transport energetic ions [028], said apparatus including: an entrance port [016] configured to transmit energetic ions [028] in an ion beam [008]; a chamber [032] connected to said entrance port [016], said chamber [032] holding a gas [034] that allows ion beam [008]propagation through said gas [034] along an ion beam trajectory [038]; a cathode [010] within said chamber [032] proximate to said entrance port [016] and said ion beam trajectory [038]; an anode [012] within said chamber [032] arranged downstream of said cathode [010] along said ion beam trajectory [038]; a gas pressure regulator [020] configured to bring about a specified pressure of said gas [034] within said chamber [032]; a coolant [004] exterior to said chamber [032] configured to maintain a specified temperature within said chamber [032]; a power supply [018] in electrical communication with said cathode [010] and said anode [012], configured to provide a voltage and current maintaining an electrical arc [022] within said chamber [032], such that when said electrical arc [022] is comprised of gas ions [024] and free electrons [026] originating from said gas [034], said free electrons [026] within said electrical arc [022]1) flow away from said cathode [010] and toward said anode [012] at an average velocity greater than or equal to an average velocity said energetic ions [028], and 2) flow along paths that at least partially spatially overlap said trajectory [038] of said ion beam [008]; a blanket [014] proximate to said chamber [032] and arranged to absorb [048] neutrons [036] created by said energetic ions [028] colliding with said gas ions [024] and said gas [034], said blanket [014] comprised of at least one material that has a higher neutron [036] absorption cross section than at least one the material comprising said coolant [004]; and one or more heat exchangers [030] in thermal communication with said coolant [004], said blanket [014], or both. These are indicative of how to make such an apparatus as well as necessary intermediates produced in the methods.

A. Spherical Confinement

In one embodiment in a quasi-spherical architecture, solid deuterium is exposed to spherically converging negative deuterium ion beams, creating a central shell of high temperature deuterons surrounded by a neutralizing cloud of electrons. This plasma is confined by scattering plasma ions and electrons against the incoming ion beams, undergoing traditional dE/dx in the frame of the converging ion beams.

Figure 4:
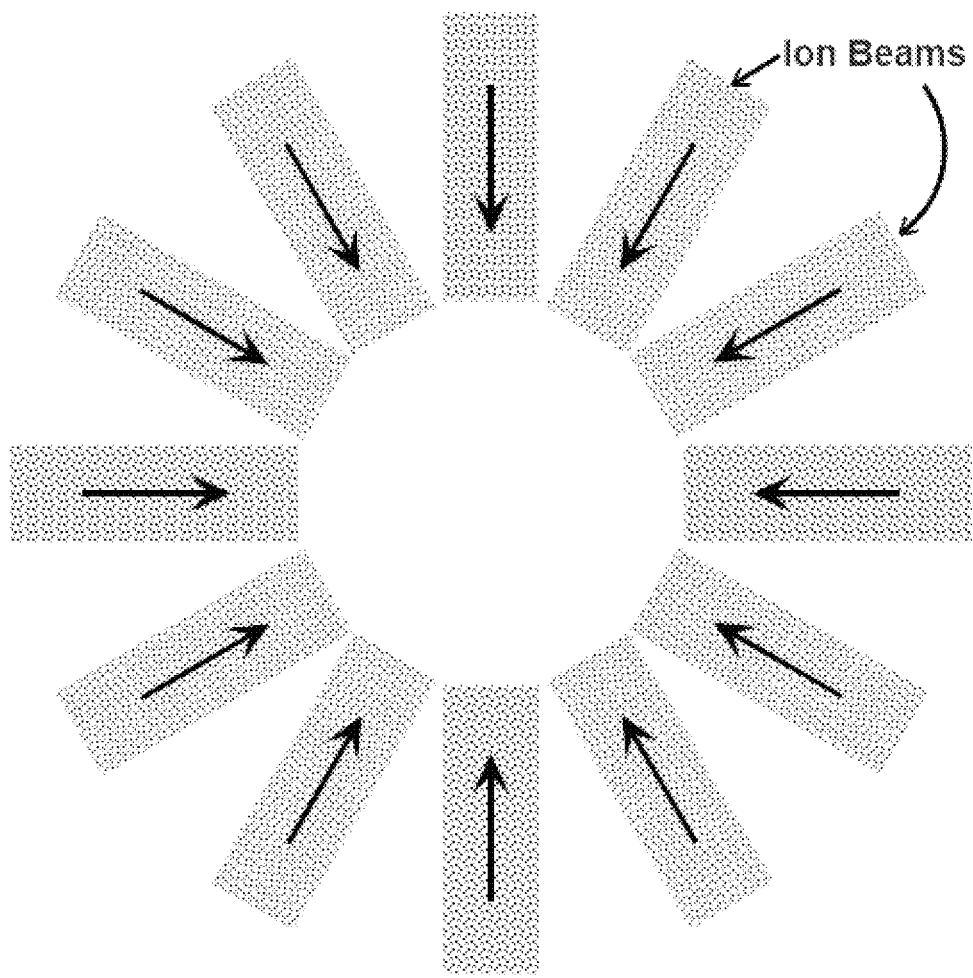
FIG. 4 is an illustration of spherically converging ion beams.

In the past, multiple ion beams have been used to mimic the spherical convergence of ions at the heart of classic inertial electrostatic confinement reactors. Using six converging ion beams, such devices have resulted in the copious generation of neutrons [036]. A quasi-spherical architecture serving as an embodiment is not limited to six beams, but enough beams to sufficiently mimic a spherical geometry that can be assessed and accurately validated. Configurations wherein many more than six, such as hundreds of small beams, are envisioned that converge at a central region. Illustratively, see FIG. 4.

Using a Green's Function approach to analyzing pulsed operations, synchronously pulsing these beams forms an infinitesimally thin spherical charged shell collapsing toward a central focal point. For ions of individual charge q and initial kinetic energy K, energy conservation requires that a shell of total charge Q will stop at a radius $R_{min}$, defined by the equation:

$$R_{min} = \frac{1}{2} \frac{qQ}{4\pi\varepsilon_o K} \qquad (1)$$

These shells were originally termed poissors by Farnsworth in U.S. Pat. Nos. 3,258,402 and 3,386,883, both incorporated by reference in their entirety as if fully restated herein. In continuous beam conditions this surface of minimum radius is called a virtual anode or cathode (depending on the charge of the beam). For example, in the case of 100 keV deuterons [090] a thin shell with a total charge of 0.1 Coulombs starting at a radius of 20 cm takes 65 ns to reach an $R_{min}$ of 0.5 cm, and then another 65 ns to travel back to the starting radius.

Figure 5:
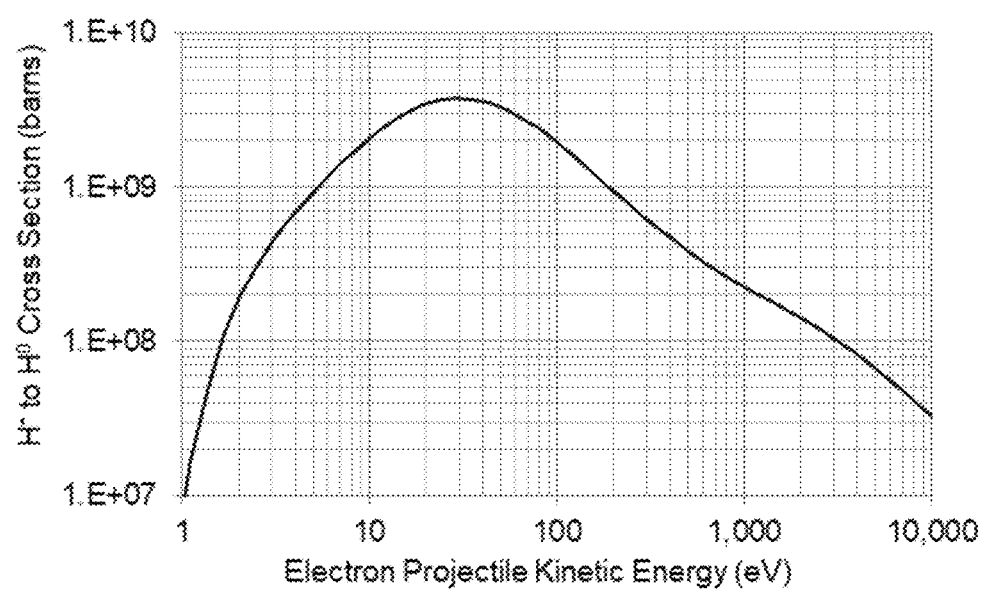
FIG. 5 is a plot of the measured cross section for neutralization of H ions being stripped and becoming neutral atomic hydrogen.

In an embodiment, a microsecond pulse of hundreds of negative deuterium ion beams converge toward the center. At $R_{min}$ these beams stop and travel back through themselves. If these beams are intense enough, the electrons orbiting the rebounding ions will partially strip some the incoming ions, causing some of the ions to neutralize (for a 100 keV ion beam the orbiting electrons have kinetic energies of approximately 25 eV). Note in FIG. 5 that this cross section for ionization is nine orders of magnitude larger than the fusion cross section, and 25 eV is near the peak cross section. The inbound neutral atoms will continue through $R_{min}$ toward the radial center of the geometry. For a given beam current the particle density at $R_{min}$ scales as the square of that radius.

Figure 6:
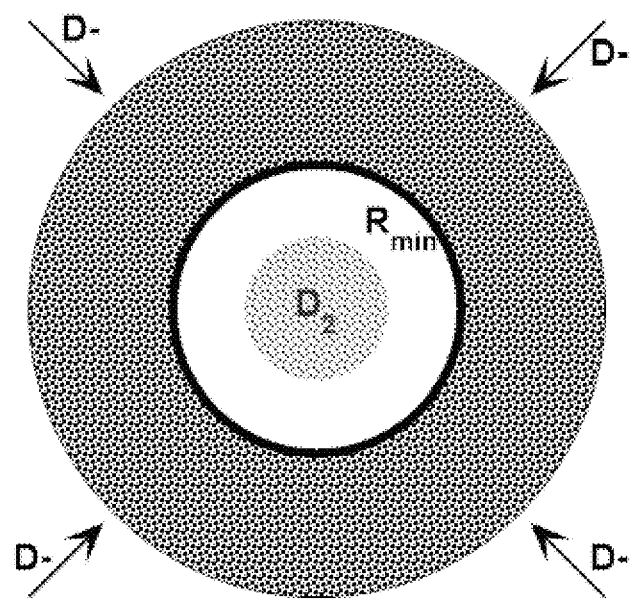
FIG. 6 is an illustration of confinement of a central deuterium sample utilizing a radially converging spherical ion distribution.

As per FIG. 6, assume that centered within $R_{min}$ there is an ensemble of deuterium molecules large enough to cause the charged products formed by DD collision events to stop and give up their ~1 MeV of kinetic energy to the surrounding molecules. This ensemble is the fuel that provides the raw material for energy gain, breakeven energy generation, and neutron [036] production. Because neutrons [036] are not charged, they will leave this ensemble without transferring much of their 2.4 MeV of kinetic energy.to the molecules. Similarly, the 3 MeV protons are too energetic and do not interact enough with the molecules to give up an appreciable amount of their kinetic energy. Therefore, each reaction event heats the ensemble by an amount of 1 MeV.

The radially in-flowing deuterium ions that are neutralized enter this ensemble and induce some deuterium-deuterium reaction events, but mostly give up their 100 keV of kinetic energy. These neutral atoms are completely stripped of electrons in the process, and the deuterium molecules dissociate, and their constituent atoms also begin to ionize. In a traditional Fusor, inbound ions and electrons are both accelerated to keV energy levels, creating nested shells of virtual anodes and cathodes. However, in this case the velocity of the electrons is the velocity of the deuterium ions, and hence the initial electron kinetic energies at the moment of ionization is on the order of 25 eV (at the peak of the ionization curve in the data plotted in FIG. 6). In addition, during the ionization process the electrons are scattered by large angles, indicating they are born with large angular momentum with respect to the ensemble center. This means that instead of creating an internal virtual cathode, the electrons orbit the center and form a neutralizing halo around the increasing large ensemble of positively charged deuterons. The central deuterons then proceed to generate a positively charged poissor that attracts and subsumes the original negatively charged shell at $R_{min}$.

At low deuterium beam densities, the deuterons would escape the poissor and be lost. At high enough ion beam particle densities, the deuterons act as incident projectiles entering the incoming negative deuterium ion beams in their relative rest frame. Like spitting into the wind, the deuterons suffer a high enough dE/dx that they reverse trajectory and are essentially confined. The deceleration due to dE/dx (see FIG. 7) can be treated as a force, which in turn is an external pressure on the central deuteron plasma. On the radial inside an equal electrostatic pressure pushes the deuterons outward. This compression is enough to create gain as long as the entire thickness and density of deuterons (and electrons) is enough to range out the DD reaction products.

A sufficient density of deuterons and incoming negatively charged deuterium ions is possible for small enough $R_{min}$ and high enough ion beam current. An ion beam density comparable to that of deuterium gas at STP conditions would be more than enough (see FIG. 8). In fact, much lower densities are feasible. The combination of poissor radius, average negative deuterium ion beam source current, and pulse compression technology can produce enough peak density to satisfy the above criteria.

B. Neutral Gas

When an incident molecule or atom travels through a gas at a kinetic energy much higher than the random kinetic energies of the gas molecules that constitutes thermal motion, the incident molecule or atom becomes quickly ionized, eventually being stripped of all orbiting electrons. For an energetic hydrogen atom incident on a region filled with gas, the atom quickly loses its orbiting electron and simply becomes an incident proton [088] through the remainder of the gas. For an energetic deuterium atom incident on a region filled with gas, the atom quickly loses its orbiting electron and simply becomes an incident deuteron [090] through the remainder of the gas. A molecule or atom that has a different number of orbiting electrons than protons in the nuclei is called an ion.

As the incident proton [088] or deuteron [090] travels through the gas [034], it collides with the gas electrons. These collisions steal kinetic energy from the incident particle. The rate of energy loss with distance is referred to as dE/dx. The quantity dE/dx is a change of kinetic energy with distance, which is a force. When this force is divided by the particle mass, an acceleration is suffered by the particle. In this case the acceleration is negative, so it is also called deceleration. This loss rate is a function of the kinetic energy of the incident particle. FIG. 7 contains a plot of this energy loss rate for deuterons [090] incident on deuterium gas at STP conditions. FIG. 9 contains a plot of this energy loss rate for protons [088] incident on hydrogen gas at atmospheric pressure but at a temperature of 400° C. In this application the term "energetic ion" [028] is synonymous with the term "incident particle".

For an energetic ion [028] of a given initial kinetic energy, the distance that the energetic ion [028] travels through a gas [034] before coming to rest is called the longitudinal range. The longitudinal range is a strong function of the initial kinetic energy, as shown for deuterons propagating through deuterium in FIG. 8 and protons propagating though hydrogen gas in FIG. 10.

The previous section concerning spherical confinement teaches that the physics of dE/dx, and hence energetic particle [028] acceleration, does not depend on the frame of reference of the interaction. A 1 MeV proton [088] suffers the same deceleration in a stationary gas [034] as the acceleration a stationary proton [088] suffers in the presence of a 1 MeV gas "wind" (a moving gas volume wherein the constituent atoms have an average kinetic energy in a given direction of 1 MeV). Eventually, within the range distance of the proton [088] relative to the wind, the proton velocity will match the average velocity of the wind.

Since the orbiting electrons of the gas [034] are the dominant source of dE/dx calculated in FIG. 7 and FIG. 9, it is the kinetic energy of these electrons in the wind that are accelerating the proton [088], not the nuclei within the molecules comprising the gas [034]. Kinetic energy of a particle is equal to one half of the particle mass times the square of the particle velocity. When discussing the interaction between a gas [034] and an energetic particle [028], it is the relative velocity between the electrons in the gas [034] and the energetic particle [028] that determines the rate of change in that relative velocity with distance due to dE/dx.

C. Gas Discharge

In one embodiment illustrated in FIG. 11, two electrodes immersed in a gas [034] contained by a chamber [032] have a voltage applied between them. The ratio of this voltage with the distance between the electrodes determines an electric field. The electrode with the lower (more negative) voltage acts as a cathode [010]. The electrode with the higher (more positive) voltage acts as an anode [012]. The voltage is applied between the cathode [010] and anode [012] by connecting them to a power supply [018] using electrical cables [064]. At low electric fields the gas [034] acts as an insulator, and very little electrical current is measured between the anode [012] and cathode [010]. Stray radiation, such as cosmic rays, will release small numbers of free electrons [026] when striking the cathode [010]. A free electron [026] is any electron not bound to a nucleus in the form of an atom or molecule.

Negatively-charged free electrons [026] are accelerated away from the cathode [010] and toward the anode [012]. If between collisions the kinetic energy of free electrons [026] grows sufficiently large to ionize the gas [034] molecules and/or atoms, more free electrons [026] are generated. One cross section (proportional to probability) of such ionization is plotted in FIG. 5 as a function of free electron [026] kinetic energy. At a breakdown voltage which depends on the pressure and composition of the gas [034], the density of free electrons [026] grows with time and distance, converting the gas from an insulator to an electrical conductor. At the same time, gas ions [024] are accelerated away from the anode [012] and toward the cathode [010]. The flow of gas ions [024] and free electrons [026] constitutes an electrical current. This process of ionization and current conduction are indicative of a gas discharge. An intense gas discharge wherein the level of ionization is greater than 0.1% is called an electrical arc [022].

FIG. 12 is an illustration of an electrical arc [022] comprising molecules of gas [034], free electrons [026], gas ions [024], and neutrons [036]. Illustrative velocity vectors induced by the electric field generated by the cathode [010] and anode [012] are also indicated for the free electrons [026] and gas ions [024]. In the case of neutrons [036] formed by reactions between energetic ions [028] and said molecules of gas [034] or gas ions [024], a random velocity vector is also indicated.

When the gas ions [024] flowing toward the cathode [010] strike the cathode [010], they induce more free electrons [026] by the process of secondary electron emission. The kinetic energy of the gas ions [024] are transferred to the electrode material of the cathode [010] in the form of heat. As the temperature of the cathode [010] increases, additional free electrons [026] flow out of the cathode [010] by the process of thermionic emission.

D. Deceleration Compensation

When the energetic ions [028] within an ion beam [008] are transported through a gas [034], the energetic ions [028] lose kinetic energy due to collisions with the bound electrons that are orbiting the atoms comprising the gas [034]. The loss of kinetic energy constitutes deceleration of both the ion beam [008] and the energetic ions [028].

In one embodiment, the gas [034] is ionized by initiating an electrical arc [022], the electrical arc [022] comprised of free electrons [026] flowing in the same direction as an incident ion beam [008], and positively charged gas ions [024] flowing in the opposite direction, wherein said free electrons [026] have an average velocity greater than the energetic ions [028] within said ion beam [008]. In this embodiment, assume that the gas [034] is composed of hydrogen at a pressure of 760 Torr (one bar or one atmosphere) and a temperature of 400° C., as calculated in FIG. 9. Also assume that the energetic ions [028] of the ion beam [008] have an average kinetic energy of 2 MeV and comprise protons [088]. Under these conditions the velocity of the protons is 0.065c (6.5% of the speed of light). If the average velocity of the free electrons [026] in the moving frame of the energetic ions [028] is 0.43c (43% of the speed of light), the relative kinetic energy of those free electrons [026] is 55 keV. In the laboratory frame (stationary with respect to the chamber [032]), the average velocity of the free electrons [026] in this embodiment is approximately 0.495c. This free electron [026] velocity corresponds to a kinetic energy of 77 keV in the laboratory frame. Also, in this embodiment assume that the fraction of ionized atoms within the gas [034] is 10% (the density of gas ions [028] is one tenth of the density of neutral atoms in the gas [034]).

According to the FIG. 9, a 2 MeV ion beam [008] comprising protons [088] suffers a deceleration rate of 1.4 keV/mm when the gas is not ionized. Similarly, a 55 keV beam of protons suffers a deceleration rate of 13.62 keV/mm. In the above embodiment with 10% ionization, the remaining 90% of neutral atoms in the gas [034] cause a deceleration rate of 1.26 keV/mm. On the other hand, assuming that free electrons [026] have the same effect on energetic ions [028] as electrons bound in neutral atoms, the 10% density of free electrons [026] in the electrical arc [022] cause an acceleration rate of 13.62*0.1=1.36 keV/mm. Therefore, under the conditions of the above embodiment, the electrical arc [022] reverses dE/dx from deceleration to a net acceleration of the ion beam [008] of approximately 0.1 keV/mm.

In general, the assumption that free electrons [026] impose the same dE/dx as bound electrons is known to not be rigorously true. Under most relevant conditions, free electrons [026] induce a greater dE/dx on an incident ion beam [008] than bound electrons in a cold gas [034]. This difference depends on the composition of the gas, density, and temperature.

E. Thermal Control

There are many mechanisms that deposit thermal energy into a chamber [032] such as that illustrated in FIG. 2, FIG. 3, and/or FIG. 11. This deposited thermal energy causes the temperature of the chamber [032] to increase. Maintenance of a specified temperature within the chamber [032] is performed by cooling [044] the chamber [032].

In one embodiment in which the ion beam [008] does not exit the chamber [032], all of the total kinetic energy of the ion beam [008], the summation of the kinetic energy of each energetic ion [028] within the ion beam [008], is deposited into the chamber. In an embodiment, an ion beam [088] with an electrical current of 3 Amperes composed of energetic ions [028] with an average kinetic energy of 2 MeV, the deposited thermal power is 6 MW.

In the embodiment illustrated in FIG. 11, a power supply [018] sourcing 500 Amperes of electrical current at a voltage between the cathode [010] and anode [012] of 10,000 Volts deposits a thermal power of 5 MW into the chamber [034] while initiating [046] and maintaining an electrical arc [022].

In an embodiment wherein the gas [034] contains at least some deuterium and the incident energetic ions [028] in the ion beam [008] contain at least some hydrogen-2 ions [090], inelastic collisions between deuterium atoms and said hydrogen-2 ion [090] can synthesize [054] neutrons [036] and the ions hydrogen-1 [088], hydrogen-3 [084], and helium-3 [086]. This inelastic collision process is illustrated in FIG. 13. These inelastic collisions release excess energy in the form of kinetic energy of neutrons [036] and ions of hydrogen-1 [088], hydrogen-3 [084], and helium-3 [086], as taught in U.S. provisional patent application 63/070,587 filed on Aug. 26, 2020 and invented by the inventor of this instant application. Provisional patent 63/070,587 titled "Mixed Nuclear Power Conversion" is incorporated herein by reference as if fully stated herein. Since the isotopes are positively charged, they stop within the gas [034] or chamber wall [002]. This excess energy is another mechanism for the deposition of thermal energy into the chamber [034]. In this embodiment, an inelastic collision rate capable of synthesizing [054]500 grams of helium-3 [086] per year would continuously deposit approximately 3.7 MW of thermal power into the chamber [032].

In the embodiment illustrated in FIG. 2 and FIG. 3, a coolant [004] in placed in thermal communication with the chamber wall [002]. While cooling [044] the chamber (i.e. removing thermal energy), the temperature of the coolant [004] is lower than the temperature of the chamber wall [002]. In one embodiment illustrated in FIG. 14, one or more heat exchangers [030]transfer thermal energy from said coolant [004] to an external heat sink [070]. Passive thermal communication provides cooling [044] as long as the temperature of the external heat sink [070] is lower than the temperature of the coolant [004].

Accordingly, the one or more heat exchangers [030] can transfer thermal energy from a coolant [004] to an external heat sink [070] and in some, but not all applications, a radiator comprises said external heat sink [070], transferring said thermal energy into air.

In an embodiment illustrated in FIG. 17, multiple chambers [032] encased in individual chamber walls [002], each transporting separate ion beams [008], can be cooled by a common bath of coolant [004]. Neutrons [036] from each of these ion beams [008] can be absorbed [048] by either a common blanket [014], or several blankets [014] in proximity to the chambers [032].

F. Blanket

Working within the same embodiment, the neutrons [036] that are produced by the inelastic collisions generally pass through the gas [034] and chamber wall [002]. The emission of energetic neutrons [036] into the environment and nearby personnel can cause damage and death. A blanket [014] is used in some embodiments to moderate and absorb [048] these neutrons [036], as taught as taught in U.S. provisional patent application 63/036,073 filed on Jun. 8, 2020 and co-invented by the inventor of this instant application. Provisional patent 63/036,073 titled "Sulfur Blanket" is incorporated herein by reference as if fully stated herein.

In some embodiments the absorption [048] of a neutron [036] by a material within the blanket [014] can release a significant amount of excess energy in the form of particle kinetic energy and gamma-rays. When this excess energy is also contained by the blanket [014], significant amounts of thermal power is generated in some embodiments. In one embodiment, the inexpensive and plentiful compound lithium carbonate [082] can have a high average cross section for absorbing [048] neutrons [036]. Lithium carbonate [082] is an inorganic compound, the lithium salt of carbonate with the formula $Li_2CO_3$. This white salt is widely used in the processing of metal oxides and treatment of mood disorders. For the treatment of bipolar disorder, $Li_2CO_3$ is on the World Health Organization's List of Essential Medicines, the most important medications needed in a basic health system. Lithium carbonate [082] has a melting point of 723° C., much higher in temperature than typical steam temperatures in electrical generator plants.

In one embodiment illustrated in FIG. 18, a blanket [014] composed, at least in part, of lithium carbonate [082] is used to moderate and absorb [048] neutrons [036] that are created by inelastic collisions in the proximity of the blanket [014]. Absorbing [048] a neutron [036] with specific atoms within the blanket [014], such as lithium atoms within lithium carbonate molecules [082], can generate predetermined isotopes [062] that in some embodiments undergo subsequent extracting [100], storing [102], and/or transporting [104]. In this context, the term "predetermined" refers to the fact that the entire design of the chamber [032], selection of the gas [034], and selection of the materials within the blanket [014] were optimized to increase the production rate of that specific predetermined isotope [062]

In an embodiment wherein inelastic collisions occur at a rate sufficient to produce 500 grams/yr of the isotope helium-3 [086] within the chamber [032], a sufficient number of neutrons [036] are absorbed [048] to also synthesize [054]500 grams/yr of hydrogen-3 [084] within the blanket [014]. At this rate of synthesis [054], the energy released by the absorption [048] of the neutrons [036] would generate 2.4 MW of thermal power in the blanket [014].

In summary, as illustrated in FIG. 15, this application teaches a process of transporting energetic ions [028] comprising synthesizing [054] one or more predetermined isotopes [062] with neutrons [036] from said absorbing [048]. In addition, this application teaches a process further comprising extracting [100] one or more of said predetermined isotopes [062]. In addition, this application teaches a process further comprising storing [102] one or more of said predetermined isotopes [062]. In addition, this application teaches a process further comprising transporting [104] one or more of said predetermined isotopes [062].

In the embodiment illustrated in FIG. 2 and FIG. 3, a coolant [004] is placed in thermal communication with the blanket [014]. While cooling [044] the chamber (i.e. removing thermal energy), the temperature of the coolant [004] is lower than the temperature of the blanket [014]. In one embodiment illustrated in FIG. 14, one or more heat exchangers [030]transfer thermal energy from said coolant [004] to an external heat sink [070]. Passive thermal communication provides cooling [044] as long as the temperature of the external heat sink [070] is lower than the temperature of the coolant [004].

G. Purification

In general, the composition of the incident energetic ions [028] in an ion beam [008] is different from the composition of the gas [034] within the chamber [032]. Because of incomplete deceleration compensation, deflection of energetic ions [028] out of the electric arc [022], an embodiment such as that illustrated in FIG. 11 wherein there is no exit from said chamber [032], or other predetermined isotopes [062] synthesized [054] by inelastic collision between the energetic ions [028] and the gas [034], the gas [034] accumulates impurities that adversely impact initiating [046] the electric arc [022], deceleration compensation, and/or synthesizing [054] predetermined isotopes [062].

In an embodiment such as that illustrated in FIG. 11, one or more gas feedthroughs [066] penetrate the chamber wall [002]. To these gas feedthroughs [066] are connected one or more gas conduits [068] that are in turn connected to one or more gas pressure regulators [020]. The gas pressure regulator [020] supplies fresh gas [034], maintains the pressure of the gas [034], and filters the gas [034] to remove impurities.

In summary, as illustrated in FIG. 15, this application teaches a process of transporting energetic ions [028] comprising purifying [056] said gas [034] to remove one or more predetermined isotopes [062] from said chamber [032]. In addition, this application teaches a process further comprising extracting [100] one or more of said predetermined isotopes [062]. In addition, this application teaches a process further comprising storing [102] one or more of said predetermined isotopes [062]. In addition, this application teaches a process further comprising transporting [104] one or more of said predetermined isotopes [062].

H. Electricity Generation

In one embodiment illustrated in FIG. 16, the process step of heat exchanging [050] can be employed for the generation of electrical power [060]. The apparatus starts with a heat exchanger [050] in thermal contact with the blanket [014] and or coolant [004]. By heating a cooling liquid [072] in the heat exchanger [076] to form a high pressure vapor [074], a converter [076] converts the mechanical potential energy of the vapor [074] into electrical power [060] in an electrical generator [080] connected to said converter [076] by a coupler [078]. The efficiency of the step of converting heat into electrical power [060] is enhanced by surrounding the blanket [014] with thermal insulation.

In one embodiment the cooling liquid [072] is water, the high pressure vapor [074] is steam, the converter [076] is a turbine, the coupler [078] is a drive shaft, and the electrical generator [080] is a standard electrical generator or alternator. In another embodiment the converter [076] is a thermoelectric element, the coupler [078] is copper wire, and the electrical generator [080] is a DC-AC converter.

Accordingly, one or more electrical generators [080] can be connected to said one or more heat exchangers [030], and in some, but not all applications, there can be a process comprising generating [052] electrical power [060] with said thermal energy from said heat exchanging [050].

I. Statement of Scope

In sum, it is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "about" or "substantially," so as to accommodate tolerance for such as acceptable manufacturing tolerances.

The foregoing description of illustrated embodiments, including what is described in the Abstract and the Modes, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

The invention claimed is:

1. A process comprising:
  propagating an ion beam of energetic ions in a trajectory
    through an entrance port proximate to a cathode that is in a first location in a chamber that contains a gas and toward an anode that is in a second location in the chamber;

regulating pressure of said gas in said chamber;

cooling said chamber;

initiating an electrical arc discharge between the cathode and the anode, the electrical arc comprising ions of the gas and free electrons;

compensating deceleration of the ion beam of energetic ions, including:
  applying an electrical current between the anode and the cathode, thereby maintaining the electrical arc discharge, and
  applying a voltage between the anode and the cathode, thereby accelerating the free electrons into the same direction as the ion beam of energetic ions; wherein
  the compensating is carried out in an electric field where the cathode at the first location and the anode at the second location respectively direct the free electrons
along paths, thereby said paths at least in part spatially overlapping trajectories of said energetic ions within said ion beam;

absorbing, in a blanket, neutrons created by said energetic ions colliding with the ions of the gas and the gas; and heat exchanging thermal energy produced by said electrical arc and said absorbing.

2. The process of claim 1, further comprising generating electrical power with said thermal energy from said heat exchanging.

3. The process of claim 1, further comprising synthesizing one or more predetermined isotopes with neutrons from said absorbing.

4. The process of claim 3, further comprising extracting at least some of said synthesized one or more of said predetermined isotopes from the blanket.

5. The process of claim 4, further comprising storing one or more of said predetermined isotopes that were extracted from the blanket.

6. The process of claim 4, further comprising transporting one or more of said predetermined isotopes that were extracted from the blanket.

7. The process of claim 1, further comprising purifying said gas to remove one or more predetermined isotopes from said chamber.

8. The process of claim 7, further comprising storing one or more of said predetermined isotopes removed from said chamber.

9. The process of claim 7, further comprising transporting one or more of said predetermined isotopes that were removed from said chamber.

10. The process of claim 1, further comprising purifying said gas to remove hydrogen-3 from said chamber.

11. The process of claim 10, further comprising storing the hydrogen-3 that was removed from the chamber.

12. The process of claim 10, further comprising transporting the hydrogen-3 that was removed from the chamber.

13. The process of claim 3, further comprising extracting at least some of said synthesized one or more of said predetermined isotopes, including hydrogen-3, from the blanket.

14. The process of claim 13, further comprising storing the hydrogen-3 that was extracted from the blanket.

15. The process of claim 13, further comprising transporting the hydrogen-3 that was extracted from the blanket.

16. The process of claim 1, further comprising purifying said gas to remove helium-3 from said chamber.

17. The process of claim 16, further comprising storing the helium-3 that was removed from the chamber.

18. The process of claim 16, further comprising transporting the helium-3 that was removed from the chamber.

* * * * *